United States Patent [19]

Rennie

[11] 3,786,505

[45] Jan. 15, 1974

[54] SELF-CONTAINED NAVIGATION SYSTEM

[76] Inventor: John Coyne Rennie, 33 Third Ave., Burlington, Mass.

[22] Filed: Mar. 4, 1970

[21] Appl. No.: 16,521

[52] U.S. Cl. ............. 343/7 ED, 343/9, 235/150.26, 235/150.27
[51] Int. Cl. ........................... G01s 9/46, G06g 7/78
[58] Field of Search ..................... 343/7 ED, 8, 9; 235/150.25, 150.26, 150.27

[56] References Cited
UNITED STATES PATENTS

| 3,504,165 | 3/1970 | Richardson et al. | 235/150.27 X |
| 3,666,929 | 5/1972 | Menn | 343/7 ED X |
| 3,118,059 | 1/1964 | Vago | 235/150.26 |
| 3,177,348 | 4/1965 | Daniloff | 343/7 ED X |
| 2,908,902 | 10/1959 | Gray et al. | 343/7 ED |
| 2,652,979 | 9/1953 | Chance | 343/7 ED X |
| 3,108,182 | 10/1963 | Gray et al. | 343/7 ED X |
| 3,113,307 | 12/1963 | Moore | 343/7 ED X |
| 3,267,263 | 8/1966 | Nelson et al. | 235/150.27 |
| 3,472,469 | 10/1969 | Evans et al. | 343/7 ED X |

Primary Examiner—T. H. Tubbesing
Attorney—Littlepage, Quaintance, Wray & Aisenberg

[57] ABSTRACT

Coordinates of fixed initial and destination points and desired approach direction are stored in an on-board programmed computer which is turned on when an aircraft passes the initial point. From aircraft speed, heading and altitude inputs, bank and attitude instructions are generated to return aircraft to a computed curved path between the points. When an aircraft leaves a path corridor, a new path is computed. All-weather approaches are accomplished without requiring local approach aids at airports.

12 Claims, 28 Drawing Figures

INVENTOR
JOHN C. RENNIE

BY *James C. Wray*
ATTORNEY

POINT-TO-POINT (UNDESIGNATED)

Flow-Charted Computations Point-to-Point (Designated)

SELF-CONTAINED NAVIGATION SYSTEM

BACKGROUND OF THE INVENTION

Aircraft landing approach systems have employed directional radiating means positioned near an end of a runway and receiving means mounted on an aircraft for producing signals which direct a pilot to fly along a homing beam. When an aircraft reaches a suitable altitude above a runway, a pilot sights the runway and lands the aircraft with visual procedures. Many such systems add flare commands near the end of the approach slope to bring the plane control even closer to touchdown.

Known systems also employ radar tracking stations on the ground for determining the position of the aricraft with respect to the runway so that a controller on the ground may direct the pilot's vertical and horizontal steering of the aircraft. Similar systems transmit the ground-gathered intelligence back to the aircraft so that a pilot may direct his aircraft according to the intelligence of position and direction from the ground antenna.

In still other approach systems, an aircraft carried radar system may home on a reflector or transmitter adjacent a runway for producing indications of distance and directions from the reflector or transmitter. All of the known systems require some ground installation at the airport adjacent an end of the runway. If the airport installation is not available, or if it is improperly matched with equipment on an aircraft, no instrument approach is possible, and a relatively high ceiling is required for an airport to be operational.

With the advent of short takeoff and landing aircraft for commercial aviation in carrying passengers and cargo between airports with short runways, the possibility of using many close in urban airports and remote rural airports for commercial flights becomes increasingly more significant. The lack of any ground approach installations at several airports which are capable of serving STOL aircraft prevents the use of those airports in all but visual flight rules high ceiling conditions. The commercial exploiting of those airports depends entirely upon weather conditions. The maintaining of scheduled runs or the availability of the airports at any required time cannot be predicted.

Many such airports would conceivably service commercial STOL aircraft on such few occasions that the construction of one or several ground-based approach systems would be uneconomical. Moreover, many such airports with present capabilities for STOL operations would be denied all-weather operation while such approach systems were being installed.

One of the inherent drawbacks of the apparatus now in general use is that full systems must be employed, or no part of the system is useful. Thus, an aircraft which is equipped for approach control with a specific system cannot use ground components from another system. Aircraft components which are useful with ground radar tracking have no use when ground radar tracking is unavailable at an airfield.

SUMMARY OF THE INVENTION

The present invention provides on-board self-contained navigation systems for vehicles. When it is desired to move a vehicle into a known second position, a known first position is used as an initial reference to begin operation of a navigation system. A track parallel to a reference plane and a slope relative to the plane are preselected as a pathway between the first and second positions. Heading direction parallel to the reference plane, vehicular speed and distance from the reference plane are measured at increments along the actual path of the vehicle. Those measurements are compared with values for the desired path of the vehicle, and correction signals are generated according to differences between the actual and desired measurements and values. The correction signals are presented to a pilot or a vehicle control which tends to return the vehicle to the desired path.

The present invention has particular application to the aircraft landing approaches in which the relative position of a fixed object and runway are known.

As distinguished from other well known landing systems, the present system is not a straight in approach system. It is not necessary that any equipment be located on the ground adjacent a runway. A preplanned program is employed to guide an aircraft from a point which is known with respect to a known landmark remote from the airport to a desired position spaced slightly above and away from an end of a runway so that a pilot may land an aircraft using visual procedures after having completed an instrument approach. Once the apparatus of the present invention has been installed in an aircraft, the aircraft is capable of making an all-weather approach in minimum ceiling conditions to any airfield in which the position of an end of the runway is known with respect to an observable landmark. The particular landmark which is related to an airfield may be a few miles away or many miles away from an airport. Preferably the landmark is a device which radiates waves which are capable of being received aboard an aircraft. One preferred form of a landmark is a radio beacon. A pilot having the apparatus of the present invention aboard flies toward the beacon and a Doppler change in the received signals marks an on-top position which is used as an initial point or first position in the approach method of the present invention.

Installation of ground equipment is not necessary at any airport to provide all-weather service to aircraft with the present invention. All that is necessary is a knowledge of an exact relationship between a fixed navigational aid and a runway end for each airport with which the present invention is to be used.

Known navigational hazards are noted where appropriate for each airport, and other restricted approach details such as for urban areas are provided for apropriate airports. The positions and heights of obstructions and the details of restricted approach patterns are provided as inputs to the computer of the present invention.

In a preferred form of the invention, conventional small commercially available computer hardware is employed. A digital computer is configured and programmed to sample inputs from navigation sensors and operate on the inputs according to a navigation program. A current precise position of the aircraft is maintained at all times. Additionally, pertinent data concerning the state of the aircraft are available at the computer output, for example true air speed and altitude.

Through computations of the steering program, the central computer generates integrated and constantly updated bank and pitch command through the pilot.

Preferably, the commands are presented visually in a flight director indicator. Consequently, the computer continuously supplies correctional vectors to return the aircraft and maintain the aircraft on the predetemined flight approach path.

For each airfield, latitude and longitude of touchdown points magnetic bearings of landing runways, barometric altitude corrected to sea level of the runways and air to ground radio frequencies are listed. At distances of from a few miles to hundreds of miles from the field and preferably between thirty and fifty miles of the field, the precise latitude and longitude of currently operational navigation aids are determined. A definite position with respect to the navigation aids, usually an on-top position is selected as the initial point or first position in an approach path.

Prior to reaching the initial point, the copilot enters the following data in the computer storage: latitude and longitude of the touchdown point and initial point, barometric pattern altitude, glide slope angle, left or right wave off and runway magnetic direction and latitude and longitude of navigational hazards. Prior to reaching the initial point, the copilot verifies to the pilot or the pilot verifies that the approach data has been entered and verified. The altimeter setting and clearance for approach are obtained, and the altimeters are set before the initial point is reached. As the aircraft passes over the initial point, a start button is depressed precisely in the on-top position of the landmark. The computer begins making computations and presents the pilot with steering commands to the pattern, altitude and approach path. The aircraft is commanded onto the final approach leg by a shallow turn; as the aircraft intercepts the synthetic glide slope, the pilot is commanded to descend. When the system indicates the approach minimum to the pilot, the pilot continues to land the aircraft through visual contact with the runway. When the pilot continues and lands in such a manner, the system has completed its function and it ceases operation.

If the pilot executes a missed approach, the command system will instruct the pilot to turn to the left or right as predetermined and to climb and fly a predetermined wave-off pattern. Turn and climb instructions are directly related to the aircraft speed, position and capabilities. The wave-off pattern moves the aircraft into a down wind leg position and turns the aircraft to reintercept the preprogrammed glide slope. The missed approach, or abort switch may be activated at any time in the approach, and the computer will automatically instruct turns and paths for reintercepting the programmed approach path. During the reacquisition phase, the computer continually compares coordinates and heading of the aircraft and the direction of the program track with respect to navigational hazards.

Four major groups of equipment are provided on the aircraft. The main groupings are the data input, the data processing, the navigation sensors and the display groups. The display group provides the pilot with steering commands and warnings. Each of the four elements of this group, the flight director indicator, the flight director control box, the flight director computer and the horizontal situation indicator, is conventionally required aboard an aircraft. The employment of the equipment in the display group adds no equipment requirement or cost to the aircraft.

Navigation sensors provide continuous intelligence of the speed, aircraft heading, true air speed, and barometric altitude. The Doppler radar, true air speed computer and barometric altimeter of the group are conventional equipment in an aircraft. The only unique element of the group which is not found in conventional commercial aircraft is an inertial-quality heading reference. Preferably, the heading reference provides accurate data during prolonged low order acceleration and during rapid heading changes and reversals.

The data input group consists of a digital entry key set and a verifier read out panel which are used to insert airfield data and special program instructions, to verify the data, and to test the equipment.

The data processing group stores, compares and operates on input data. Within this group are a control digital computer, multichannel input and output boxes, synchro to digital and digital to synchro converters and computer software.

The input group, the data processing group and interfacing for the conventional equipment are the only additional required apparatus for installing the present approach system in commercially equipped aircraft.

Many optional features are available for the present navigation system. Included in some possible features are a rolling map cockpit display which presents the computer approach track, the aircraft position and track on a map which includes the pertinent approach points, navigational hazards and other data of interest to the pilot. A peripheral vision command indicator may be installed above the pilot's glare shield, to permit the pilot to look for the runway while the command data is presented within his peripheral field of view. Essentially, the peripheral indicator would be a repeater which would be employed in the final stages of approach. A radar altimeter might be provided to continuously determine the aircraft's absolute altitude above the ground. In flat terrain or when adequate input information is available, the computer may accept readings from the radar altimeter in lieu of the readings from the barometric altimeter.

The invention has as objects the provision of methods and apparatus for generating a predetermined approach path between a first initial point adjacent a known reference and a second desired position by generating a predetermined path, sensing vehicle speed, heading and height with respect to the second position, and generating correction commands for maintaining a vehicle on the preselected path and returning the vehicle to that path.

Another objective of this invention is the provision of an approach system for aircraft landings which includes the generating of an approach path, the sensing of aircraft speed, altitude and heading and generating command instructions for returning an aircraft to the preselected path. Another objective of this invention is the provision of aircraft approach apparatus comprising interconnected aircraft sensors, a computer and input and verifying apparatus as well as visual display apparatus all positioned on board an aircraft for directing an aircraft from a first reference point to second position near a landing field without employing external ground monitor approach apparatus.

These and other objects of the invention will be apparent from the disclosure which includes the foregoing and ongoing specification and claims and drawings.

BRIEF DESCRIPTION OF THE DRAWINGS

FIG. 8 is a steering mode flow chart.

DETAILED DESCRIPTION OF THE DRAWINGS

Figure 1:
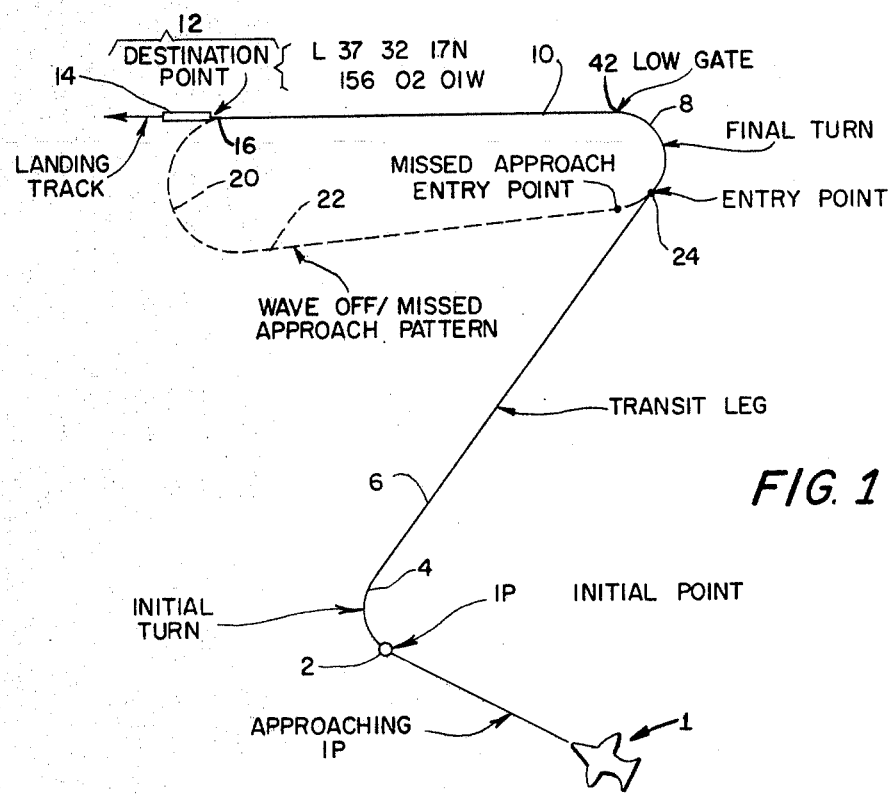
FIG. 1 is a schematic representation of a track of an aircraft approach projected on a horizontal plane.

FIG. 1 generally shows a plan view of an aircraft track as it approaches the initial point and undergoes a preselected track. Aircraft 1 approaches initial point 2 which is a geographically fixed point whose latitude and longitude are known. As aircraft 1 passes on top of the initial point 2, a switch is pressed, and instructions are displayed to the pilot to make the initial turn 4 to the heading and locus of the transit leg 6. At the appropriate time when the speed and heading and radar Doppler references have indicated that the aircraft has proceeded along transit leg 6 for a sufficient length, instructions are given to begin a final turn 8. The aircraft then begins its final approach leg 10 which includes the final glide slope, resulting in positioning the aircraft for visual contact with destination point 12 which is a geographically fixed and known touch down point at the end of runway 14.

At point 16 in a glide slope of final leg 10, an audible or visual signal is flashed to the pilot. At that time, the pilot should have established visual contact with the destination point. If no visual contact has been established, the pilot presses a missed approach button, and instructions are given him for making a missed approach turn 20 into down wind leg 22 for reintercepting the preselected glide path at entry point 24.

Figure 2:
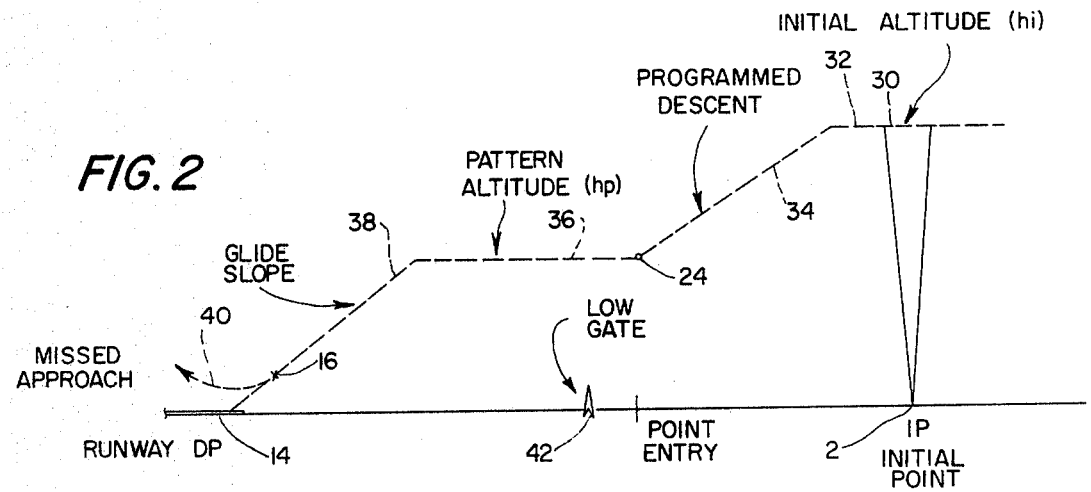
FIG. 2 is a schematic elevation of approach slopes.

FIG. 2 is an elevational schematic of the approach path shown in FIG. 1. An aircraft intercepts a narrow area 30 over an initial point 2 which is approximately thirty to fifty miles from the destination point. The aircraft begins a turn 32 and a programmed decent 34 on a transit leg of the pattern and makes a final turn when it reaches its pattern altitude 36. The aircraft continues on the final leg in the pattern altitude until the pilot is instructed to begin the glide slope 38 down to point 16 where the pilot continues his approach to the runway destination point 14 or presses a button for missed approach instructions to begin a climbing turn 40. The aircraft then regains pattern altitude and reenters at missed approach reentry point 24.

A low gate 42 is shown in both FIGS. 1 and 2. Where a reference point is conveniently available in a final leg of a predetermined approach path, the known positions of the latitude and longitude of the reference point are entered in the computer. Although the low gate 42 is not an essential feature of the invention, it is useful in a redundant check of the actual approach path deviation from the preselected approach path.

Figure 3:
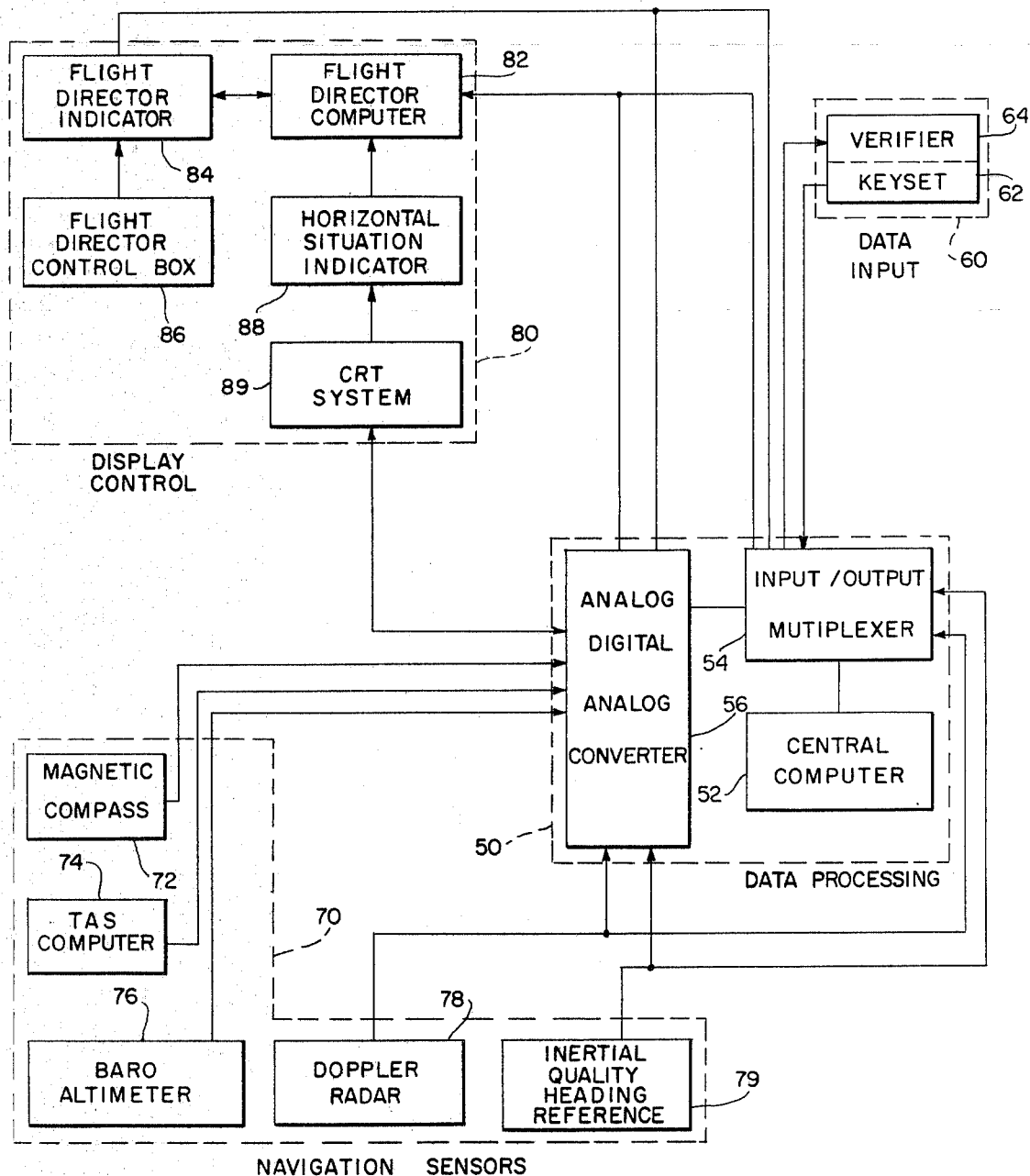
FIG. 3 is a schematic diagram of the functional interrelationship of elements of the invention.

Referring to FIG. 3, the self-contained on-board system is generally divided into four groups of equipment.

Data processing group 50 includes central computer 52 with a processor section and a storage or memory section. An input-output multiplexer 54 is connected to the computer 52, and an analog or synchro to digital and digital to synchro converter 56 is connected to the input-output multiplexer. The converter accepts the smooth synchro or analog inputs from the navigation sensors and converts them into digital data which the computer can employ. The converter changes the digital outputs of the computer to outputs which may be employed by the display control group.

Data input group 60 includes a key set 62 in which data such as the runway heading, the latitudes and longitudes of the initial point, destination point and low gate, if any, and other useful information are communicatd to the computer.

Verifier 64 ensures that the correct inputs have been made and checks the computer when required.

Navigation sensors 70 include a magnetic compass 72, a true air speed computer 74, barametric altimeter 76, Doppler radar 78 and an inertial-quality heading reference 79.

The display control group 80 includes a flight director computer 82, a flight director indicator 84 and a flight director control box 86 as well as a horizontal situation indicator 88. A cathode ray display system 89 or a peripheral vision display may also be included in group 80.

While FIG. 3 shows the general interrelationship of the groups and elements, each of the elements and their system interconnection is described in more detail with reference to FIG. 4 which shows a preferred embodiment of element interconnections in the on-board self-contained system.

Figure 4:
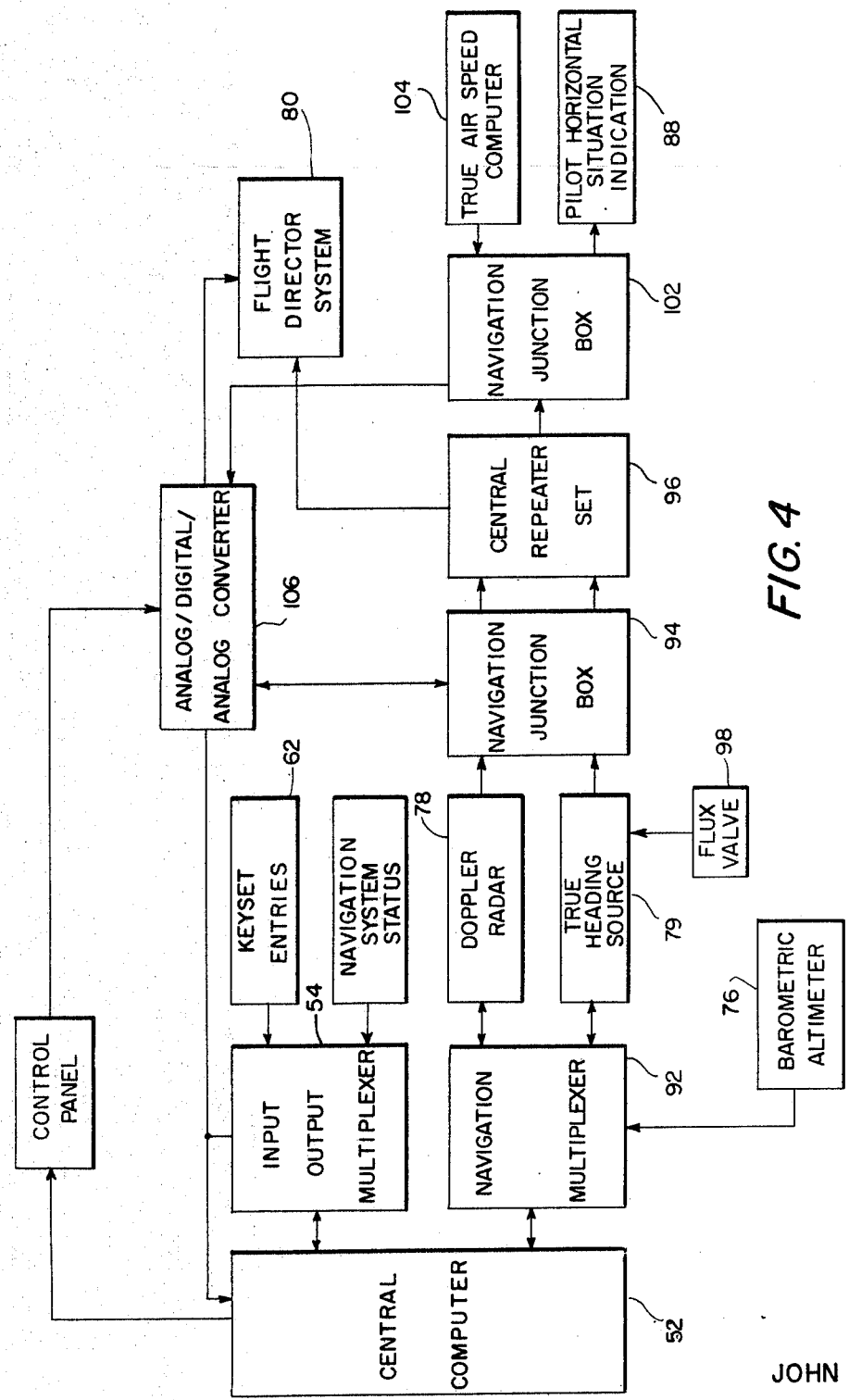
FIG. 4 altitude-to-altitude a schematic detail of a preferred embodiment of equipment interconnections.

The navigation subsystem which is shown in FIG. 4 provides maneuvering data, en route steering, the terminal guidance as well as standard position, altitude, velocity and pitch and roll data. That data is supplied to the appropriate flight instruments, to control boxes, and to the central digital computer 52.

A Doppler radar set 78 provides several different forms of information. Incremental distances along a heading and across a heading are supplied by Doppler radar 78 to navigation multiplexer 92. A heading component of Doppler velocity and across heading component of Doppler velocity are also fed to the navigation multiplexer 92. A drift angle in synchro or analog form is fed via navigation junction box 94 to a central repeater set 96 for use by the flight director display system 80 and particularly the horizontal situation indicator 88 as shown in FIG. 3. Status indications are sent to the central computer 52 via the navigation multiplexer 92. Built-in test equipment in Doppler radar 78 operates continuously for gross malfunction checks. Self-tests of the Doppler radar are initiated manually or by the computer. Three major commercially available elements are included in the Doppler radar set; the transmitter-receiver antenna, a computer-frequency tracker, and a central indicator.

The receiver-transmitter antenna generates, radiates and detects microwave energy directed to and received from the earth's surface for providing Doppler signals to the computer frequency tracker in a well known manner. The antenna assembly is mounted within a conventional radome on the lower outside of an aircraft fuselage. The receiver-transmitter antenna is pitch and roll stabilized in a well known manner to compensate for aircraft maneuvering of 60 degrees in roll and 30 degrees in pitch. The antenna is fixed to the aircraft in azimuth.

The computer-frequency tracker converts Doppler signal data from the antenna to the form required by the central computer and control indicator. The tracker receives velocity signals and self-test signals from the central computer 52 and simulation signals from the indicator.

The control-indicator which is located in the cockpit is capable of resolving signals from the Doppler radar into drift angle and ground speed and to display them to an operator.

The central repeater set has three identical electronic control amplifiers. Each of the amplifiers has a power supply monitoring circuit and a number of repeater channels. Central repeater set 96 provides multiple analog synchro type signals such as heading, pitch, roll, drift angle, bearing and distance to go. Go no-go status indications with those values are provided to the horizontal situation indicator 88, director display system 80 and to the central computer 52.

Each channel of central repeater set 96 is capable of driving up to eight external control transformers, one torque repeater, or two independent loads consisting of up to 20 independent meter movements. Internal test apparatus in the central repeater set continuously monitors the set for detection and isolation of malfunctions whenever the set is energized. External fault indication signals are provided with the set, and the test equipment includes provisions for testing before and after flights.

An inertial-quality true heading source 79 sends true heading to central computer 52 via navigation multiplexer 92. True heading is updated at least once every 50 ms. The system generates magnetic variation by comparing true heading with magnetic heading from a flux gate input 98. When remote magnetic compasses are used as primary heading sources, the operator inserts magnetic variation via the data input key set.

Barometric altimeter 76 supplies data to computer 52 through multiplexer 92 at least every 50 ms. Undesirable aerodynamic noise characteristics in the output signal may be removed electronically by conventional complementary techniques of filtering.

Navigation junction box 102 supplies analog synchro type data from the true air speed computer 104, and from the central repeater set 96 through the synchro-digital converter 106 to central computer 52.

Key set 62 is a conventional commercially available key set which has rear lighted push buttons which are illuminated in appropriate groups and sequences for indicating readiness to receive specific data. The key set provides the capability for the operator to enter information and receive information from the computer program. All functions may be controlled by the key set. Preferably the switches are of push button read-out type which are illuminated from the rear with projected read-outs. Each switch is a viewing screen. Matrix switches select groups of switches which may be activated and indicate those groups by rear lighting and color coding.

Each universal matrix read-out switch can display up to five messages. Four of the messages are function messages in a type format, and one is a colored background illumination. Depression of any matrix read-out switch results in the computer program implementing the function which is associated with the message displayed on the viewing screen at the time of depression. A function message displayed against an opaque background represents a non-active alternate action function or a momentary function, and a function message displayed against a colored background is an active alternate action function.

Several read-out devices are provided on the verifier display panel which is associated with the key set. Each device contains twelve separate optical systems, and a light source in each optical system may be energized separately to produce 12 different messages. Some of the optical devices are used to display cues, alerts or amplifying information to the operator, and some are used to provide the operator with visual verification of the numerals entered on the keyboard.

Some switches on the keyboard are used for single functions. In this group of switches, alternate action switches have background lighting. When alternate action switches are depressed, they are lighted and the function remains in action until the switches are again depressed, distinguishing the light and discontinuing the function. Momentary switches are depressed once and the action is completed.

The flight director system 80 is described with general reference to FIGS. 3, 4, 5 and 6. Included in the flight director system are the flight director indicator 84 in FIG. 3, the flight director computer 82, the flight director control box 86 and the horizontal situation indicator 88. Flight director indicator 84, which is mounted in front of the pilot, depicts aircraft attitude and pitch and roll commands generated by the flight director computer 82 and central computer 52. Flight computer 82 is a small special purpose analog computer which operates in conjunction with central computer 52 to produce pitch and roll commands.

The flight director control box, while not a necessary part of the present invention, is a normal complement of the indicator. When the aircraft is in operation other than in programmed approach, desired headings, courses, radials, etc. can be entered in the control box.

While the complete approach may be carried out by following directions of the flight director indicator 84, the pilot is additionally provided with a situation indication by horizontal situation indicator 88. Heading, drift angle, track, distance to go and course deviations are presented on the situation indicator.

Figure 5:
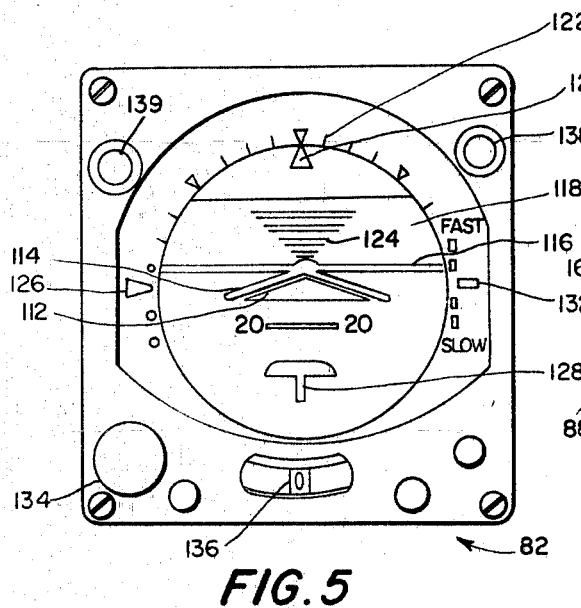
FIG. 5 is an elevation of a commercially available flight director indicator which is used when carrying out the objectives of the invention.

A commercially available flight director indicator is employed, and for purposes of understanding, a face of indicator 82 is shown in FIG. 5. Aircraft attitude and flight director information is presented by the relationship of a fixed delta-shaped symbol 112 with respect to computed bank and pitch command displayed by a V-bar command indicator 114 and a servo-driven horizon line 116. The horizon line is carried on a pitch tape 118 which is divided into colors to represent the sky and the ground respectively.

Roll attitude is shown by the position of the horizon 116 relative to aircraft symbol 112. A full 360° roll presentation is possible.

Bank angle pointer 120 and scale 122 are located near the top of the instrument. As is conventional, the bank angle scale is marked at 10, 20, 30, 45 and 60° positions.

Pitch attitude is shown by the vertical position of the movable pitch tape 118 relative to fixed aircraft symbol 112. Tape 118 is colored as above described and is calibrated 124 for various pitch angles between plus and minus 90°.

V-bar command indicator 114 is a pair of yellow inverted wedge-shaped bars that move up or down to command a climb or descent, and that roll right or left to command an appropriate bank for path turns and track recovery.

The V-bars display computed bank and pitch commands to fly a selected heading and to hold a selected altitude or glide slope.

Triangular glide slope pointer 126 is used to present the center of the preselected glide slope and displays the vertical deviation of the aircraft from the glide slope center. The glide slope scale center-line represents the center of the glide slope, and each dot on the scale represents a quarter degree deviation. Actual deviation is depicted. If the pointer is displaced upward, the aircraft is below the optimum glide slope.

The course deviation runway symbol 128 at the bottom of the instrument face is masked until the final leg of a preselected approach. Pointer 128 symbolizes the runway center line and shows deviation left or right of the approach course by appropriate lateral motion. Runway symbol 128 also moves vertically to indicate radar altitude.

A speed pointer 132 on the right side of the instrument face provides an optimum approach speed. Attitude test button 134 permits testing of the pitch and roll servo systems and the gyro warning flag. Inclinometer 136 presents a weighted ball in a liquid filled curved glass case to provide an indication of unbalanced flight. Meter 136 is commonly known as a slip indicator.

A dimmable light 138 at the upper right corner of the instrument provides annunciation of a missed approach mode.

A dimmable light 139 at the upper left corner of the instrument face illuminates when the aircraft has descended to the preset minimum altitude, at which time the pilot must make the land or missed approach decision. Prominent red flags on the face of the instrument indicate malfunctions of the vertical gyro, roll and pitch computer, central computer, command display, runway symbols, speed display or any of the on-board navigation system interfaces.

Figure 6:
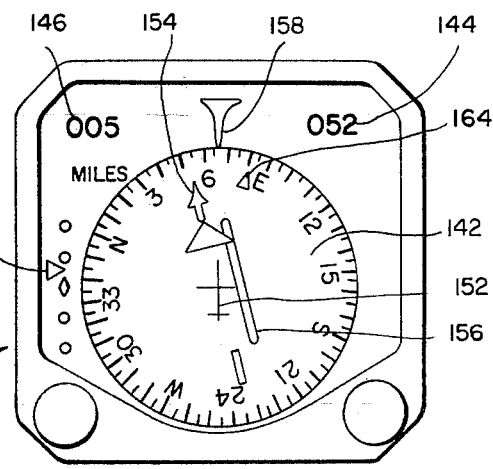
FIG. 6 is an elevation of a horizontal situation indicator which is used in a preferred embodiment of the invention.

The face of a horizontal situation indicator 88 is shown in FIG. 6. The situation indicator displays a pictoral plan view of an aircraft with respect to magnetic north, selected heading and selected course. Heading, selected heading, selected course and heading deviation are read against a servo-driven azimuth card 142. The selected course is also displayed digitally on a course counter 144. A digital distance display 146 is provided on the face of the instrument. Meter movements display course deviation, "to-from" indication and glide slope deviation and operate warning flags to monitor compass, navigation and glide slope signals. A stationary aircraft symbol 152 provides a pictorial presentation of aircraft position and heading. When related to the movable parts of the course indicator, the fixed aircraft symbol located at the center of the instrument face shows aircraft position and direction relative to the azimuth card.

Course arrow 154 is rotated against the azimuth ring by the course control. The arrow is set to a magnetic track which coincides with the desired preselected course. The V-bar command indicator in the flight director indicator shown in FIG. 5 displays steering commands to capture and track the preselected course. The movable center section 156 of course arrow 154 is the lateral deviation bar which represents the center line of the preselected course. The aircraft symbol represents the position of the aircraft with relation to the course. The lateral deviation bar begins to move when the aircraft is approximately 16° from the course center. The deviation scale dots represent about 5° and 10° deviation from the center line. In the final leg of the approach, bar 156 begins movement approximately 4° from the course center, and the dots represent 1¼° and 2½° deviation from the course.

Magnetic compass information is repeated by the rotating azimuth card. Aircraft heading is read on the card under the lubber line 158. Triangular glide slope deviation pointer 162 is in view only during the programmed approach.

Heading marker 164 is used in non-approach operations in the manual heading hold mode. In that mode the system generates steering commands to maintain the heading corresponding to that at which the heading marker is set. Distance counter 146 is usually used to read slant range during airways navigation. During programmed approaches, the counter is used to read miles and tenths of disance to go to the destination point.

The flight director system control box 86, which is shown in FIG. 3, is mounted on a control console near the pilot. A knob on the control box may be set to any one of any number of desired modes of operation. The knob automatically returns to a missed approach position when a go-around button is depressed on the pilot's yoke.

Figure 7:
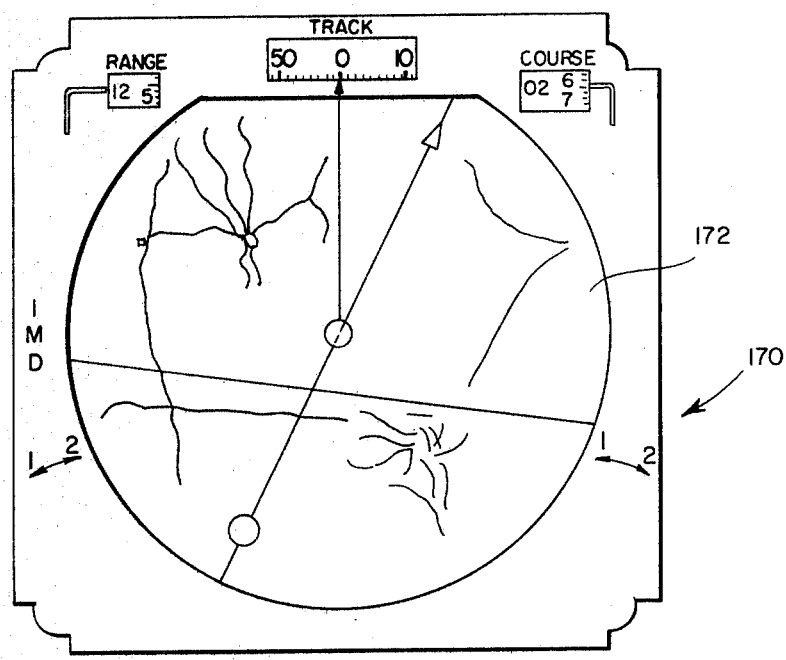
FIG. 7 is a rolling map display as used in a modified embodiment of the invention.
Figure 3:
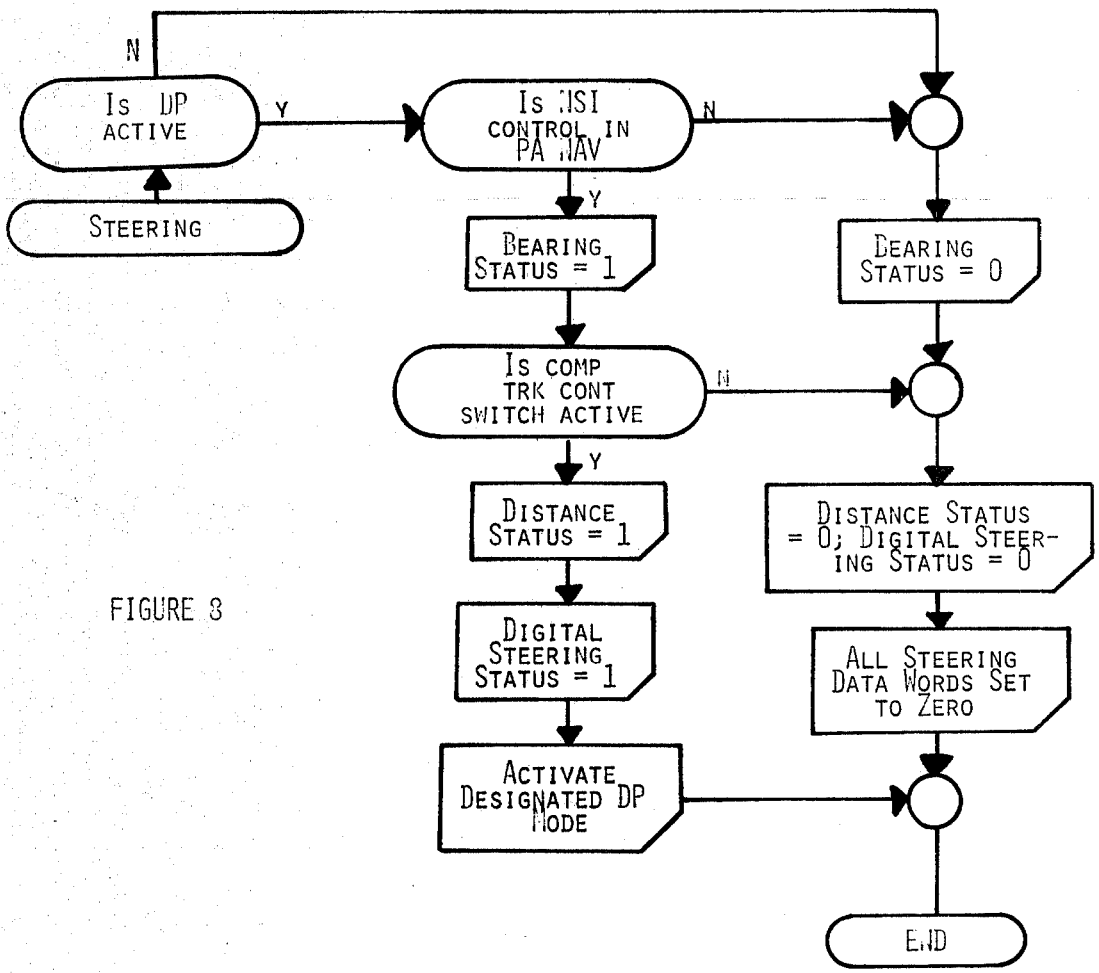

One form of auxiliary display might be a cathode ray tube display capable of depicting alpha numerics, circles, lines and dots as well as cues and alerts. Another type of suitable auxiliary display is a rolling map display such as generally indicated by the numeral 170 in FIG. 7. That display shows a pilot's position on an aerial navigation map which is appropriately scaled. Map 172 may be projected from a slide onto a frosted face of the instrument, or an actual map may move beneath a transparent face. Course and range may be presented digitally on the instrument face. A track indicator is provided at the top of the instrument, and lines on the instrument indicate the aircraft heading and desired heading.

The central computer is selected from a number of commercially available small computers for accuracy, capacity and speed and adaptability to flight conditions. The primary function of the computer is to sample and process raw data from navigation sensors, to manipulate the data by such operations as smoothing and averaging, and to transform the data into a coordinate system, aircraft position and steering command. Preferably the computer used in the present system has a memory capacity of between 4,000 and 8,000 words. The accuracy and reliability of commercially available digital computers of that capacity are well within the requirements of the present invention. Speeds of currently available computers, that is instruction sequence repetition rate capabilities are in excess of the requirements of the present invention.

The software program for the computer has several aspects. In the steering aspect, the program causes the computer to generate point-to-point and altitude-to-altitude steering equations and to convert the computations to commands to the flight director system. The computer is programmed to maintain a completely self-contained navigation picture in latitude and longitude. All navigation sensor data is converted into incremental changes in aircraft position. The program causes the computer to maintain a constant check on all system elements during flight and to generate warning to the operators when faults are detected. The program permits the operator to test peripheral inputs to the computer for accuracy and completeness. Initialization and recovery aspects of the program permit the operator to effect total system initialization and selective on-line reinitialization of individual subsystems during the flight. The program controls the generation of cues to assist an operator in data entry sequences and alerts to indicate the existence of a condition which is of immediate concern. As an example of a program which is suitable for carrying out the objectives of the invention, the following navigation and steering programs are presented.

In the present invention general point-to-point steering is accomplished by the pilot's following directions from the flight director indicator and from the horizontal situation indicator. The central computer supplies the necessary data to the indicators to direct the pilot through predetermined maneuvers to arrive at the destination point. Digital data flows from the central computer to the converter, and analog data flows to the flight director computer. Analog information also flows from the converter through a central repeater to the pilot's horizontal situation indicator. When the computer program receives a request to supply data to the director system, that is when the "on-top" switch is depressed as an aircraft passes an initial point, the program places the system into a digital steering mode via the output of an appropriate status signal. In that mode the horizontal situation indicator analog devices continue to develop the course error by subtracting the actual heading from the desired heading of the computer course. The flight director computer senses the status signal, realizes the activeness of the digital steering, and uses the course error, cross-track error and command bank angle supplied by the central computer to develop a bank angle for the flight director indicator command V-bar. The sensitivity of the command bar to course error or cross-track error depends on gains which are preset constants in the flight director computer.

As prerequisites for operation of the computer in either a vertical or horizontal steering mode, longitude and latitude designations of a destination point and an initial point must be active in the system. Other mandatory items to be entered are desired track at touchdown, pattern altitude, desired glide slope, and missed approach pattern direction. The pilot's course selector on the flight director instrument panel must be in a programmed approach navigation position. The computer is programmed to monitor the status of that selector. The computer track control switch in the pilot's control panel must also be selected. The status of that switch is also monitored by the computers. When the steering mode is initiated, sequential checks are made on the presence of the destination point and the initial point data and on the setting of the switches. If any information is negative, all steering data words are set to zero.

If all three conditions are satisfied, the point-to-point steering is activated. The computer performs the following operational sequence. The computer sends a status signal to the output multiplexer, destination point distance status −1. The computer program computes the rhumb line distance-to-go to the active destination point, and a status signal is transmitted to the output multiplexer: digital steering status −1. In addition, data words with computed values are set to the synchro converter for destination point distance, command bank angle, course error, crosstrack error, and desired course. A flow chart in FIG. 8 summarizes the above steering mode selection procedure.

The system enables an approach to be made toward a predetermined destination point with known latitude and longitude. The computer will construct the approach so the aircraft will approach the destination point on a preselected track. That can be accomplished regardless of the starting attitude and altitude or initial heading of a craft.

The components of the solution are one-half standard rate turns at one and one-half degrees per second and straight line segments. Full standard rate turns may be employed in another embodiment of the invention.

The turns are executed by transmission of a one-half standard rate turn command bank angle and zero error signals for cross-track and course errors from the computer program to the flight director computer. The computer program continues the transmission until the aircraft course error and cross track error to the straight line segment between the turn circle and the destination point become greater than the specified maximum values which define a corridor about the straight line segment. Preferably, the specified maximum values are no more than 45° or 2,000 yards from a predetermined course. Within that range, the steering computer can effectively operate to return the aircraft to the predetermined course. Within that corridor, the flight director subsystem can utilize error signals, together with a zero bank angle supplied by the computer program for maintaining the required course. If an aircraft exceeds those maximum values and exits from the defined corridor, the computer program recalculates a new flight path, thus defining new half standard rate turns and line segments. That feature allows the pilot to ignore the flight director indicator and still be presented with a valid command to track to the destination point and intermediate approach points.

To make an approach, the steering program is initiated by an on top preferably manually entered input signal. In a preferred embodiment to accomplish an approach on a designated track to the destination point, the computer program directs the aircraft to execute two half standard rate turns, each of which is followed by a linear path segment. The first turn orients the aircraft correctly with respect to a low gate which is a point about 8 miles from the destination point on a reciprocal of the desired inbound final heading. At a point approximately 15 hundred yards from the low gate, the aircraft is commanded to execute the second half standard rate turn to approach the destination point in the desired direction. The position in which the second standard rate turn is begun is known as the entry point.

Upon initiation of steering by an on top signal, the computer determines the optimum flight path using an initial left or right standard rate turn. If the destination point or low gate lies inside one of the half standard rate turns, an opposite turn is selected by the computer. For example, the 270° turn to the left might be selected instead of a 90° turn to the right.

The following sequence describes procedure which is performed by the computer program upon activation of programmed approach steering. A transformation is performed so that a positive Y axis lies along the current aircraft track angle with the aircraft at the origin. Locations and sizes of circles and locations and lengths of line segments are computed for all existing solution combinations of left and right turns. The distance-to-go is computed for all solutions, and the flight path is selected as the solution with the shortest distance to go. Output zero error signals and a half standard rate bank angle corresponding to the initial turn of the selected path are sent to the flight director. Procedure continues until the corridor capture constraints are satisfied. Following corridor capture, a zero bank angle is produced by the computer along with computed error signals with respect to the last computed linear segment between the two turns. That continues until a corridor capture constraint is exceeded or until the aircraft penetrates a one hundred yard radius around an entry point for the final turn. If the corridor is exceeded, the computer program reinitiates the problem and recomputes the flight path.

In the precision approach system of the present invention, there are two important altitude changes. A descent is first programmed to bring the aircraft to the pattern altitude by the time it reaches the entry point of the final turn. The airplane is then maintained at the pattern altitude until it intercepts the preselected glide slope, whereupon the final glide is directed.

The first altitude change which occurs before the final turn is referred to as the programmed altitude change. At the initial point, the computer program samples the current aircraft barometric altitude. If the current altitude is not equal to the previously inserted pattern altitude, the computer generates a change, usually a descent, but an ascent if so required.

The computer samples distance-to-go to the entry point and ground speed of the aircraft, and computes the time-to-go to the entry point. A computation is then made of the appropriate descent or ascent rate. The computed rate or a preprogrammed rate of five hundred feet per minute, which ever is greater, is used to generate the vertical steering commands. When the difference between the current altitude and pattern altitude is less than five hundred feet, the computed altitude change rate is used for altitude adjustment.

Figure 9:
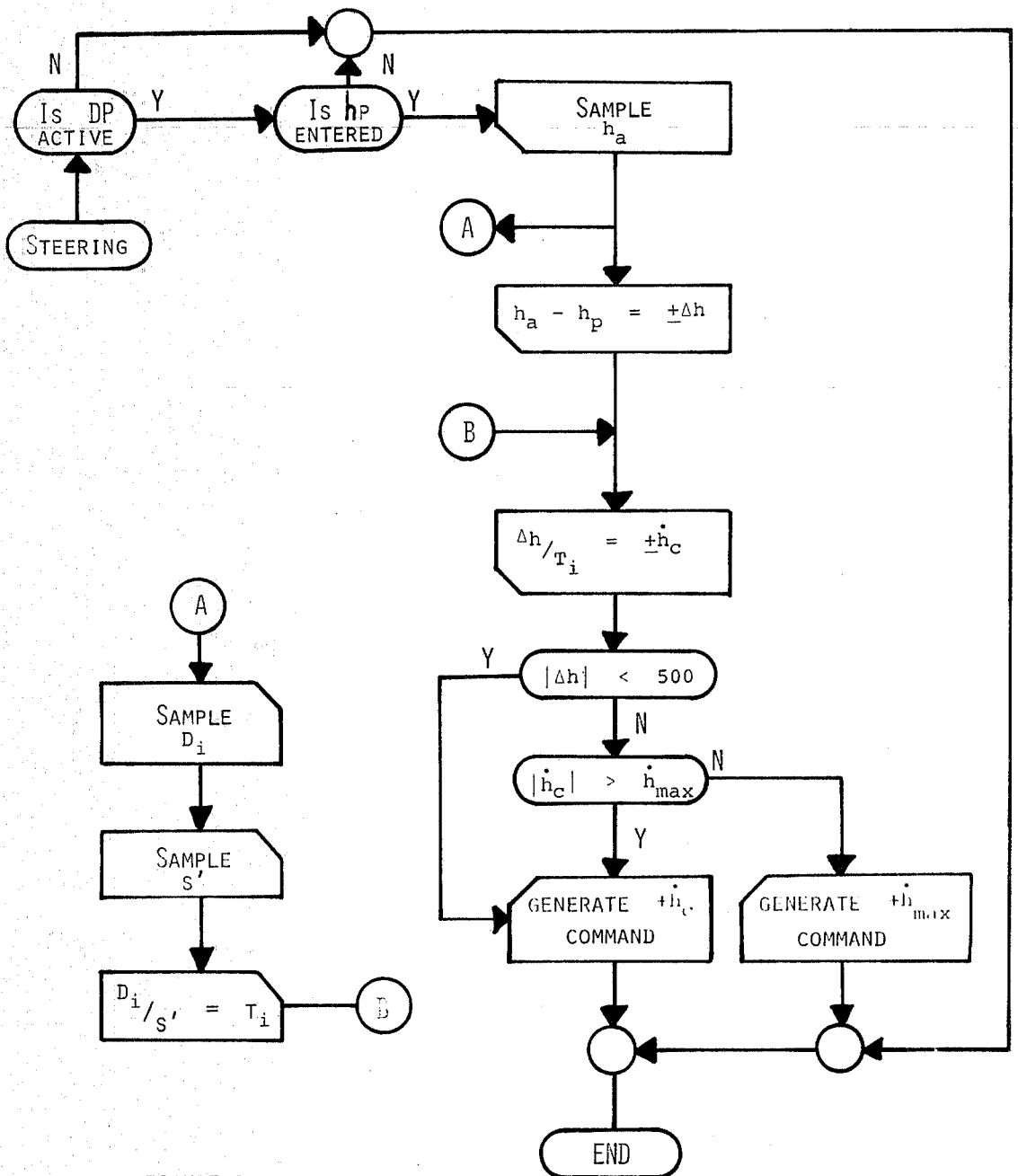
FIG. 9 is an altitude change flow chart.

A flow chart in FIG. 9 restates and summarizes the foregoing computations.

As in the azimuthal steering, the computer continues to generate data each 200 ms. The sensitivity of the flight director indicator command bar depends on gains preset as constants in the flight director computer.

When the aircraft enters the preprogrammed one hundred yard radius capture gate at the entry point, the altitude-to-altitude steering function enters the precision approach mode. In that mode, the flight director and main computers use previously described logic to generate climb or descent correction commands to maintain the programmed altitude. When the predetermined glide slope is intersected, the horizontal distance-to-go to touch down point is computed. Using the prescribed glide slope angle, the correct glide slope attitude for the distance-to-go is computed. After sampling actual aircraft attitude and comparing it with the correct glide slope attitude, a glide slope deviation is determined. From that deviation, the glide slope descent command is modified as necessary to adjust the rate of descent on the glide path. When minimum approach altitude is reached, the pilot is alerted. If no input is received, the computed program will continue its computations to touch down. If a missed approach signal is received, the program immediately shifts to a missed approach mode and generates coordinated bank and climb commands to minimize altitutde loss.

A restatement of the foregoing sequence is found in the following FIG. 10 flow chart. in FIGS. 10 and 11 $h$ is equivalent to $h°$.

At any time in the precision approach mode, i.e. after capture of the entry point of the final turn, the pilot may elect to abort the approach by pushing the appropriate go-around key. When that code is received, the computer program and the flight director computer generate an immediate climb command and a zero bank angle. When the actual altitude is equal to or greater than the programmed altitude, an initial half standard rate turn downwind will be commanded. The computer will then generate azimuthal and vertical steering to place the aircraft at the entry point of the final turn in the predetemined pattern altitude as in the previous approach. The method used once the downwind turn is initiated is identical to the point-to-point and altitude-to-altitude logic previously described.

A flow chart as follows shown in FIG. 11 reiterates the described logic.

Digital dead reckoning methods, programmed approach initiation, coordinate systems and approach navigation control methods are described herein. The basic navigation coordinate system in the present invention is a latitude-longitude system, and all positions are stored geocentric latitude and longitude. An X—Y system of coordinates is used in the computer for computations only. When the present invention is used above 65° latitude, a thrid set of grid navigation coordinates is used to account for convergence. The computer program continuously maintains the aircraft's absolute geographic position in correct relationship to fixed geographic points.

The absolute geographic position may be set or corrected at any time by the operator through the use of position fixing methods which are subsequently defined. The absolute geographic aircraft position is determined by dead reckoning the aircraft from its last dead reckoning fix, its initial fix point, or its updated fix position. In addition to the dead reckoning increments, aircraft position is modified by drift correction which may be computed or inserted. Preferably, dead reckoning increments are computed from digital Doppler or digital air data computations, and the aircraft's position is computed every 200 ms.

Digital dead reckoning information is provided by a Doppler radar set, an inertial-quality heading source, and a true air speed computer. Barometric altitude is used only in the vertical steering computations. The primary mode of the digital dead reckoning navigation of the present invention is the digital Doppler mode. A digital air data mode is provided as a backup in case the Doppler fails or suffers temporary signal loss. Those modes are automatically selected by the computer, but the operator can effectively select the air data mode by turning the Doppler radar off.

Prior to the start of the approach, the operator must have entered all essential data such as latitude and longitude of the destination point and initial point, desired pattern altitude, desired glide slope angle, a turn direction for a missed approach, minimum approach altitude, and magnetic variation.

Preferably, there is always just one active primary and backup Doppler dead reckoning mode. On any change in the mode of dead reckoning, aircraft positions are determined by the new dead reckoning mode starting where the old dead reckoning mode stopped. That is ture for changes from primary to secondary modes or vice versa.

Doppler sets are usually based on nautical miles of 6,080 feet; for maximum accuracy, the computer program uses 6,076. 1033 feet. When conventional Doppler sets are used, data from the Doppler set is multiplied by 1.0007.

The Doppler dead reckoning mode is shown in the following FIG. 12 flow chart.

The primary navigation dead reckoning rate is five times per second. At each cycle the computer program updates the system held aircraft geographic position based on the dead reckoning data obtained from the navigation sensors. For greater accuracy, aircraft position is extrapolated every 50 ms based on current aircraft dead reckoning position and aircraft ground speed. When a regular 200 ms position is computed, the extrapolated aircraft position is sequenced with the updated position.

For programmed approaches greater than 50 miles, a system drift is computed and used. The system drift is a vector exactly opposite in direction and equal in magnitude to apparent positional drift of the system-held aircraft geographic position with respect to its actual position on the earth. Computations are based on the difference between the dead reckoning position at a fixed position and the elapsed time since the previous geographic fixed position. System drift is computed when a special function code is entered.

Doppler data consists of distance increments accumulates along and across an aircraft true heading. The computer program requests true air speed during the normal 200 ms navigation cycle; true heading is requested from the heading reference at a 50 ms rate. Doppler distance increments are requested at a 200 ms rate, which is regulated by the computer's internal clock.

The Doppler distance status of the current navigation cycle is known at all times, since that determines the validity of the Doppler data. That signal is received in one of the navigation status words via the computer interface. The computer program continuously checks the stored Doppler distance status. If the Doppler status is up for the cycle, the Doppler is considered to be valid. If the status signal is donw for the cycle, Doppler is consider to be invalid, and the program initiates a switch to an air data dead reckoning mode and sets a warning light in the cockpit to indicate invalid Doppler. When the status signal again becomes valid, the warning light is extinguished, and the Doppler dead reckoning mode is again used.

On the initial navigation cycle following the detection of a valid Doppler status signal, the computer program requests all Doppler distance data in order to start equipment counters. That data is ignored, and the backup source of dead reckoning is used for the initial cycle. That step allows the Doppler data to stabilize. The Doppler data is used for the next dead reckoning cycle, provided the Doppler status remains valid.

When valid Doppler status exists, the computer program performs the following operations. True heading is weighted and averaged over the five stored 50 ms values. True air speed is smoothed. True heading is tested for reliability. Distance increments are converted into ground speed. Ground speed is tested for reasonableness. Wind velocity is computed. Drift angle is determined.

The computer then calculates distance traveled increments in true north-south and east-west directions. Those increments are modified by any stored system drift. The increment components are converted to changes in latitude and longitude, and a new geographic position is generated. The ground velocity is used for steering computations and for wind velocity computation.

In addition to the position computation, a wind aloft or aircraft altitude wind is computed. The wind velocity is the algebraic difference between components of ground speed and smoothed true air speed. That wind velocity is important for use in the backup air data dead reckoning mode.

In the air data mode, the computer program uses the input values of true air speed and true heading. A value for wind velocity, which is also required, either is computed during the last valid Doppler cycle, or is inserted via the cockpit key set. Air data dead reckoning computation proceeds as follows. True heading is weighted and averaged over the five stored 50 ms values. True air speed is smoothed. True heading is tested for reliability. Ground speed components are computed. Drift angle is determined.

The ground speed components are then used to compute aircraft position increments. Those increments, modified by system drift if necessary, are then used to update the geographic position of the aircraft in latitude and longitude coordinates.

The operator has several selections which are available through the key set. Some of the functions which the operator may actuate are: on-top, alpha-numeric functions, system drift accept, skip, optional end of message, end of message, wind velocity, system drift insert, missed approach, and initial point data.

If the computer system has not been started, the computer interprets the on-top function code as an activation signal, and the computer begins operating on the previously entered information.

If the system has been previously started, the computer interprets the on-top function as a new fix over a previously entered fixed point such as a low gate. If the system has been initialized but no geographic fix points have been entered, the on-top signal is ignored.

If the system is updated over previously entered fix, the aircraft latitude and longitude are changed to the entered latitude and longitude, and the computed system drift is displayed on the verification panel. The system drift accept function is background lighted. If the operator decides to accept the computed drift, he depresses the background lighted accept button. If the pilot decides to reject the system drift correction, he simply ignores the lighted button, which is automatically extinguished in a short time.

The alpha-numeric functions buttons are used to enter digits and letters during all data entry sequences.

The skip function enables the operator to pass over a certain item in a cuing sequence. That function is active only during periods when a cuing sequence is in progress and when the current entry item is optional. In that case, the skip button is background lighted so that it may be pressed at the pilot's option.

The end of message functions are used by the operator to indicate an end of entry or series of entries. During an entry sequence, when the minimum required data has been entered, the optional end of message button will be background lighted. At the end of a sequence, the end of message button will be lighted. The computer program interprets the signal from either button as an end of message.

The wind velocity function is used when the system is in air data mode. When a switch to air data mode occurs, the operator is cued by the Doppler invalid warning, and the last computed system wind is displayed on the panel. If the operator is not satisfied with the wind, he may depress the wind velocity button, and enter a wind direction and speed. The system will always accept a properly and manually entered wind.

The computer program receives and transmits various status signals. Received status signals come from the Doppler radar, the on-top function switch, the horizontal situation indicator and flight director, the heading source, the central repeater, a navigation test, and the altimeter.

When the Doppler communicates a 1 signal in a self-test underway sequence code, the computer switches to air data dead reckoning and sets a warning light in the cockpit. A 0 signal in the sequence indicates that the Doppler is again operational, and the computer program requests all Doppler data in order to reset the equipment counters. The data is ignored for the first following cycle, and the air data dead reckoning mode continues. If the zero is received in the next cycle, the Doppler dead reckoning mode is reinstituted.

A 1 signal from the horizontal situation indicator directs the computer to transmit magnetic bearings to the indicator.

A 0 signal from the true heading source indicates that the source has failed and switches the computer to magnetic compass and heading inputs. In that condition the magnetic heading and magnetic variation are used to compute true heading. A warning light is indicated in the cockpit. A 1 indication from the heading source indicates that the source is in a go condition.

Go no-go signals from the central repeater to the computer concerning heading status, altitude status and distance status may indicate that amplifiers have failed or are overloaded. Since a no-go indication does not necessarily affect computer program inputs, no action is taken except for the lighting of advisory warnings in the cockpit. A navigation test signal to the computer indicates that a simulated true heading which should be used for a dead reckoning is available through the converter.

Upon detection of a 0 no-go indication from the barometer, the computer program sets an immediate warning flag in the flight director indicator and seizes the altitude-to-altitude portion of approach steering.

Other equipment, interface, computer and program go no-go tests which are conventional in the digital computer art are employed to periodically or continuously check the approach system.

Although the combined apparatus of the present invention may be used and the method of the present invention may be accomplished with other programs, the foregoing is described as one convenient form of program for use with the apparatus and method of the present invention. It is appreciated that several components of the invention may be replaced by components which produce useful results. As an example, the barometric altimeter may be replaced with a radar altimeter and the particular displays may be replaced with other forms of displays, with audible communications, or with direct control of air foil surfaces. The foregoing specific embodiment simply discloses the best contemplated mode of practicing the present invention.

The parcticer of the present invention will find the following equations and flow charts which use symbols as defined in the glossary useful for purposes of carrying out the invention.

GLOSSARY

The following designations are employed uniformly in the specification, are widely used with the noted concepts.

Point-to-Point (Designated track)

$a$ track-angle oriented $X$ coordinate of the $DP$ rel. to a/c $b$ track-angle oriented $Y$ coordinate of the $DP$ rel. to a/c $c$ $X$ coordinate of center of final circle $d$ $Y$ coordinate of center of final circle $R^1$ Radius of ½ SRT turn circle $X_{2K}$ distance in $X$ coordinates from aircraft to entry point $Y_{2K}$ distance in $Y$ coordinates from aircraft to entry point $l_{1p}$ latitude of pt of entry on final turn circle (entry point)

$L_{11p}$ longitude of pt of entry on final turn circle (entry point)

$j$ type route between departure pt. and entry point on final circle (0, 1, 2, 3, 4)

$A$ distance squared between centers of initial and final turn circles $P$ distance between the parameters of the above circles $R$ radius of any turn circle $f$ working parameter $D_j$ total distance-to-go if pair j circles used $k$ type final circle selected $D_k$ distance from the aircraft to the entry point (final circle)

$\omega k$ arc traversed on final circle $K$ constant $D_K$ total distance to go if pair $K$ circles used $\omega$ arc of turn circle to be flown $D_1$ straight line distance from aircraft to entry point $S$ linear distance from the final circle departure point to the destination point ($S = 8$ miles)

$S^1$ aircraft ground speed $T$ Time-to-go to the destination point ($DP$)
$X_{TR}X_T$ with respect to transformed axis
($X_d$, $Y_d$) north-oriented $X$, $Y$ coordinates of the $DP$ relative to the aircraft
$\hat{c}$ shortest arc length between entry and exit point of final circle
($X_T$, $Y_T$) entry point of final circle with respect to exit point
($X_1$, $Y_1$) point where aircraft leaves initial circle
($X_{11}$, $Y_{11}$) exit point of turn circle relative to center of circle
($X_{1j}$, $Y_{1j}$) point where aircraft leaves initial circle if pair $j$ of circles used
($X_2$, $Y_2$) point where aircraft arrives at final circle
($X_{22}$, $Y_{22}$) position ($X_2$, $Y_2$) with respect to center of final circle
($X_{2j}$, $Y_{2j}$) point where aircraft arrives at final circle if pair $j$ of circles used
($X_3$, $Y_3$) exit point of final circle
$\alpha$ desired course
$\beta$ rotated aircraft track angle at destination
$\Gamma$ destination designated aircraft track angle
$\gamma_{2j}$ angle corresponding to arc traversed on final circle
$\epsilon_{ct}$ cross track error
$\epsilon_\psi$ course error
$\theta$ north-oriented bearing to $DP$ relative to aircraft
$\theta_G$ aircraft track angle
$\Lambda$ bearing of last computed final run segment
$\Lambda 1$ relative bearing of the last computed final run segment
$\phi$ appropriate axis transformation angle for determining $X_{TR}$ such that $C$ may be determined
$\phi_o$ command bank angle
$\omega_j$ angle corresponding to arc traversed on initial circle
Point-to-Point (no designated track) (not covered above)
$A_1$ distance squared from center of turn circle to the $DP$
$D$ $DP$ distance-to-go
$g$ gravity acceleration (32 ft/sec²)
$K_1$, $K_L$ conversion constants (see Appendix D)
$L_d$, $l_d$ latitude/longitude of the $DP$
($L_{ta}$, $l_{ta}$) aircraft latitude and longitude
$\gamma$, $\alpha_1$ Angles used for solving triangles
Altitude-to-Altitude
The basic altitutde-to-altitude equations and flow chart employ the following symbols.
$h_p$ preselected barometric pattern altitude
$h_i$ aircraft altitude at the $IP$ (baro.)
$D^1$ distance to go to the entry pont (final turn)
$S^1$ aircraft ground speed
$T^1$ time-to-go to the entry point
$h^\circ_c$ computed vertical velocity required
$h^\circ_c$ computed vertical velocity required
$h^\circ_{max}$ maximum vertical velocity command (= 500 ft/min)
$h_a$ current aircraft barometric altitude
$\alpha$ prescribed glide slope angle
$h_s$ correct glide slope altitude at certain distance-to-go to touchdown ($DP$), based on prescribed
$h^\circ_a$ aircraft rate of descent necessary to reach touchdown point, given $h_a$ and $D$ $D$ $DP$ distance-to-go
$\theta_1$ glide slope descent command
$\Delta h_s$ deviation of aircraft from synthetic glideslope
$h^\circ_s$ synthetic glide slope descent rate
$\Delta h^\circ$ difference between $h^\circ_a$ and $h^\circ_s$
$\Delta h^\circ_a$ *computed rate of descent correction*
The following glossary has particular application to the flow charts in FIGS. 8 – 24.

GLOSSARY

Figure 10:
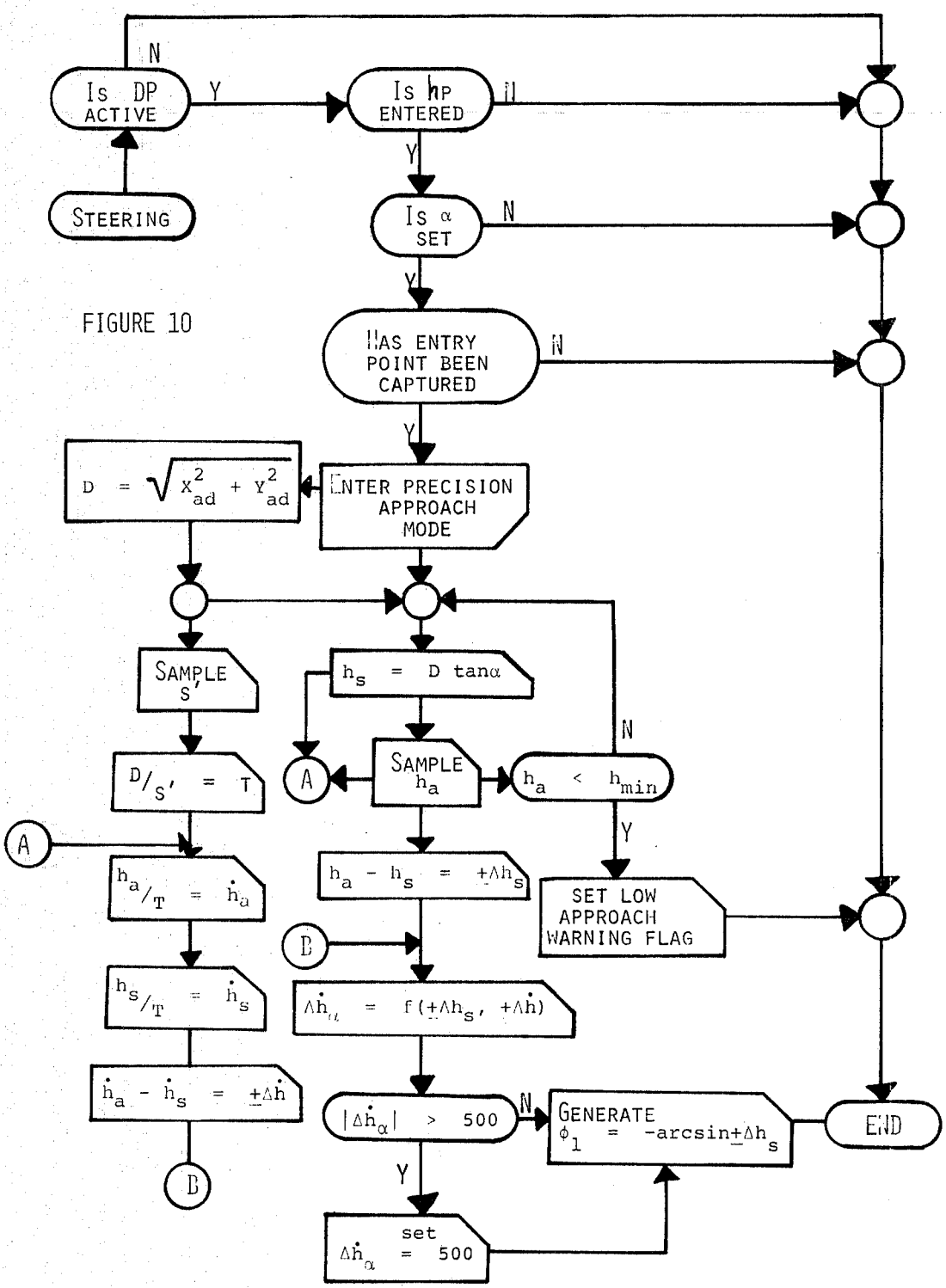
FIG. 10 is a flow chart of altitude to altitude steering in the precision approach mode.
Figure 11:
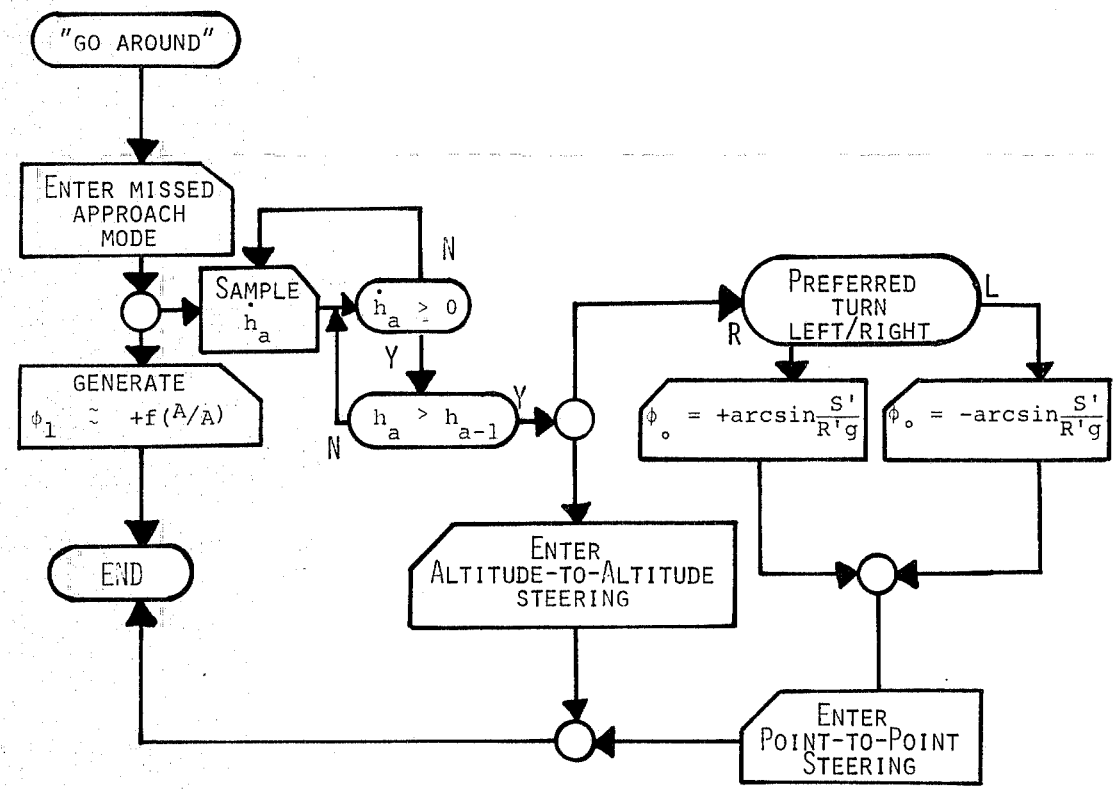
FIG. 11 is a missed approach mode flow chart.
Figure 12:
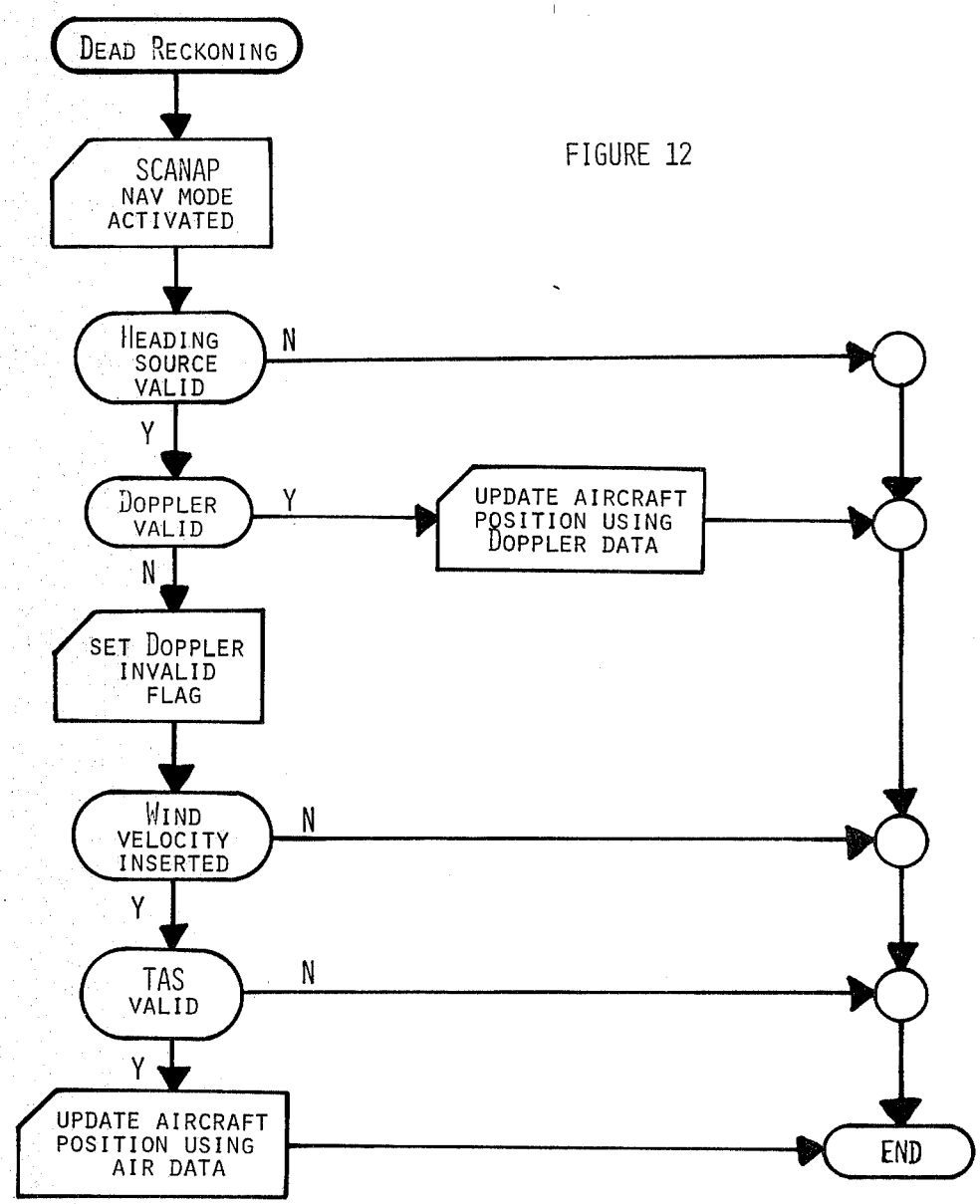
FIG. 12 is a Doppler dead reckoning flow chart.
Figure 13:
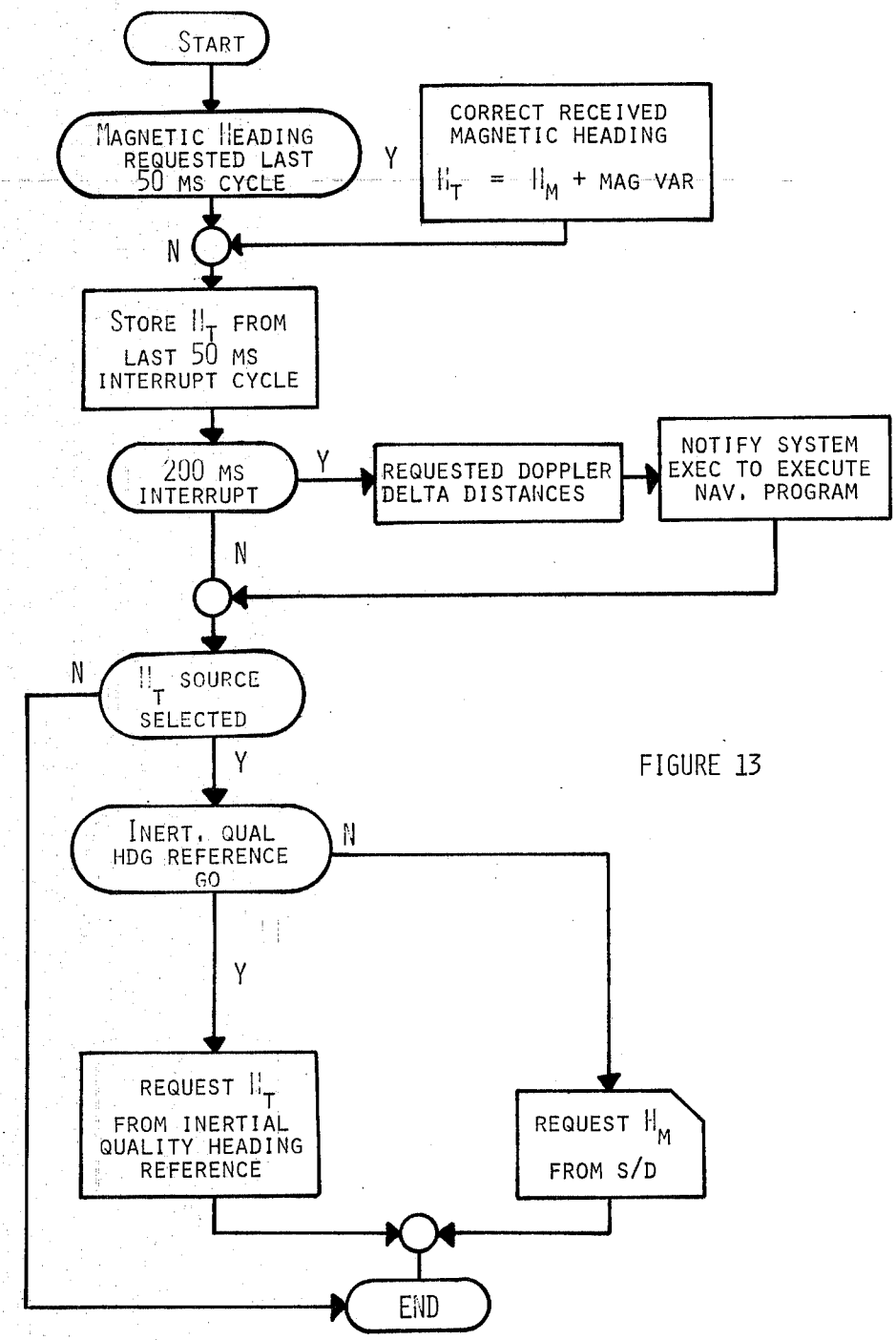
FIG. 13 is a heading flow chart.
Figure 14:
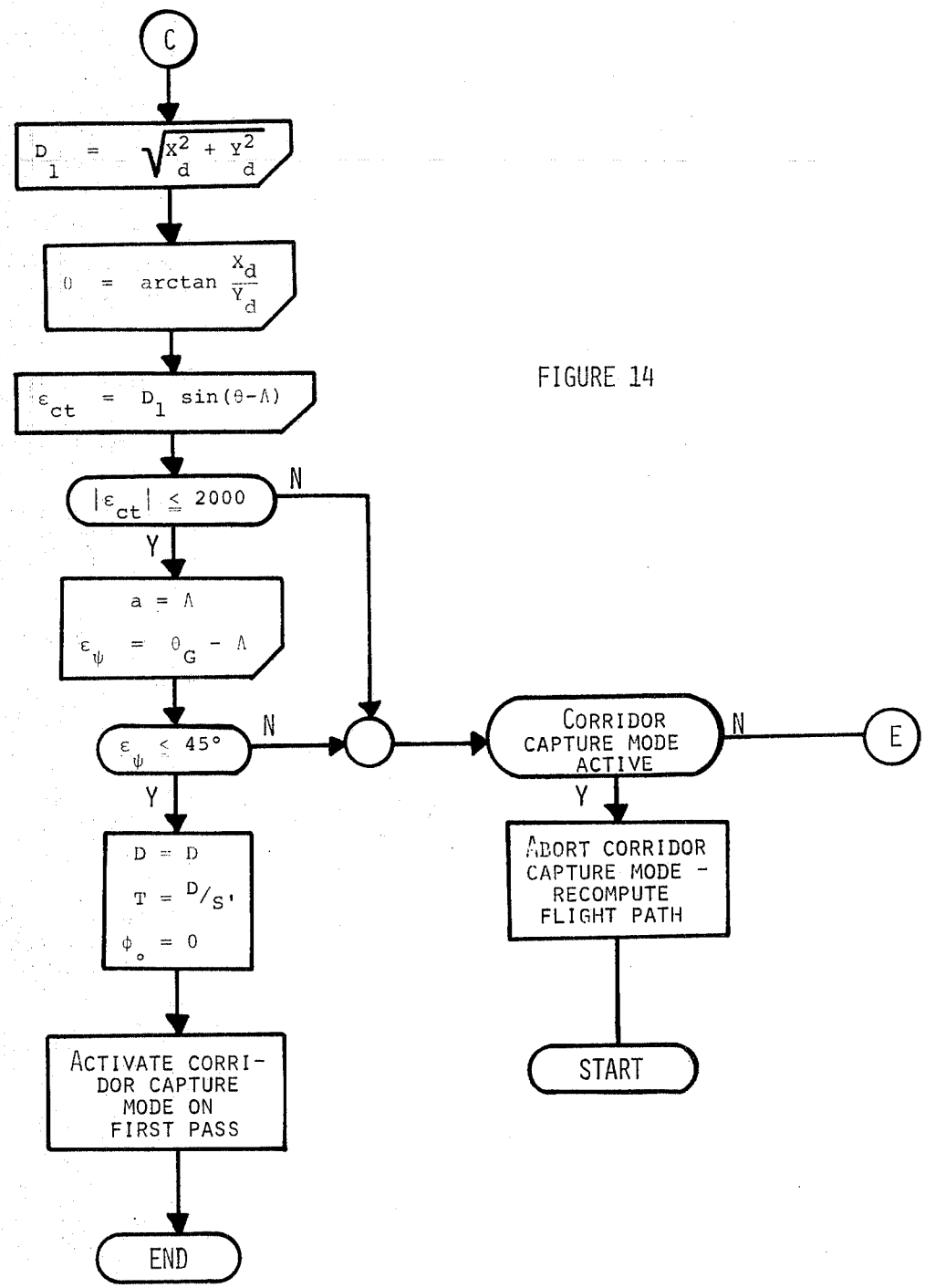
FIGS. 14 through 24 are flow charts showing steps in computations employed in the present invention.
Figure 14A:
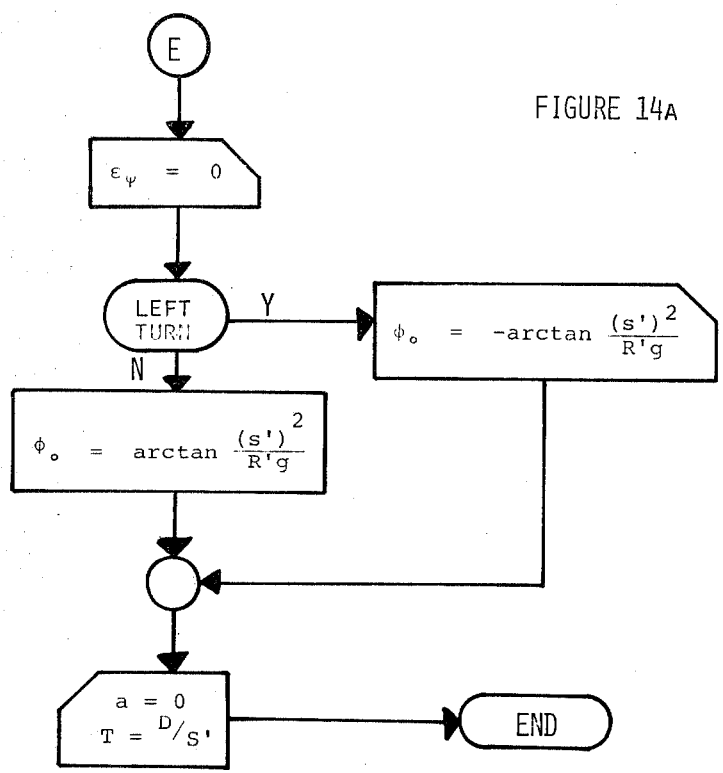
Figure 15:
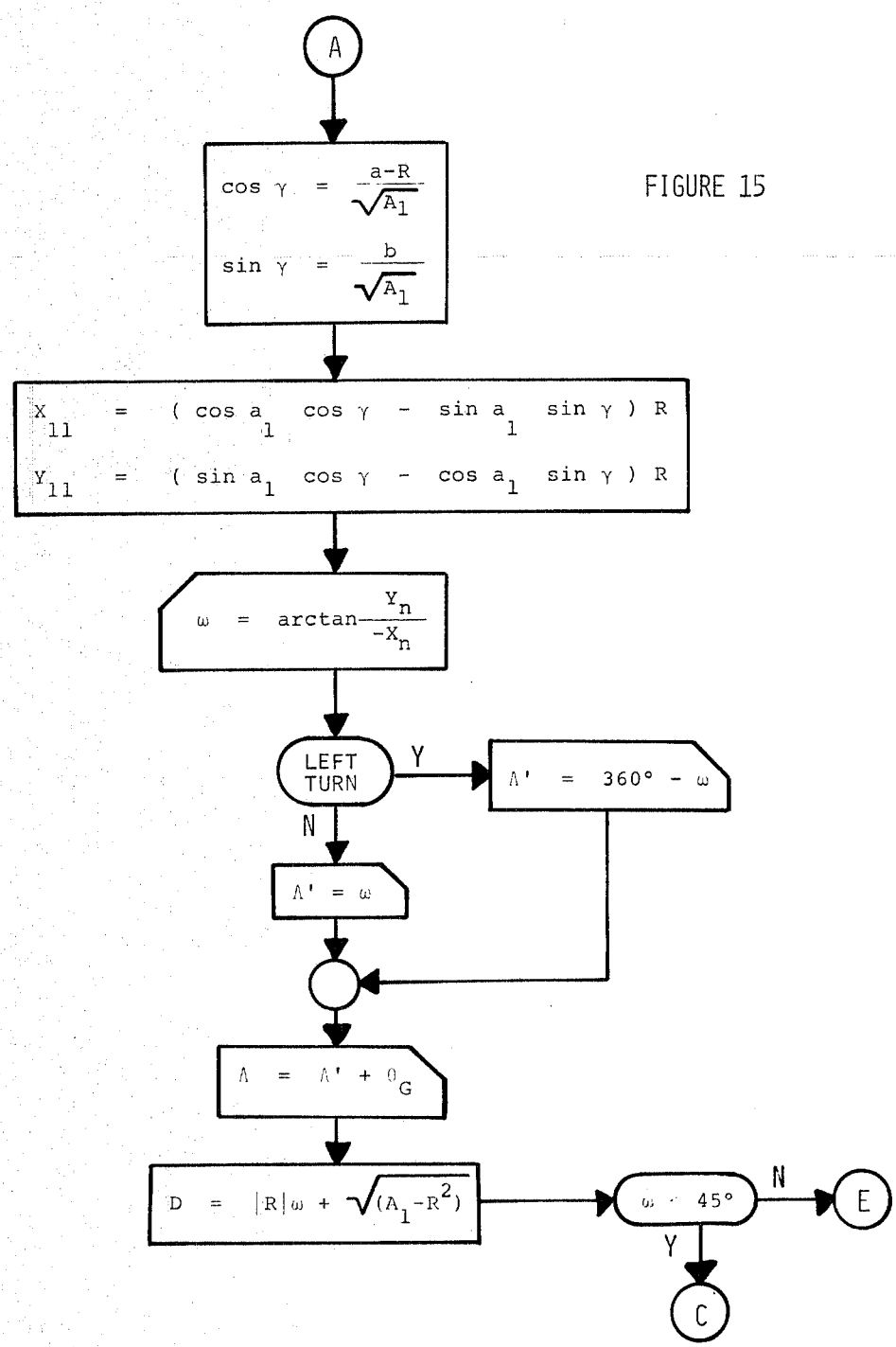
Figure 16:
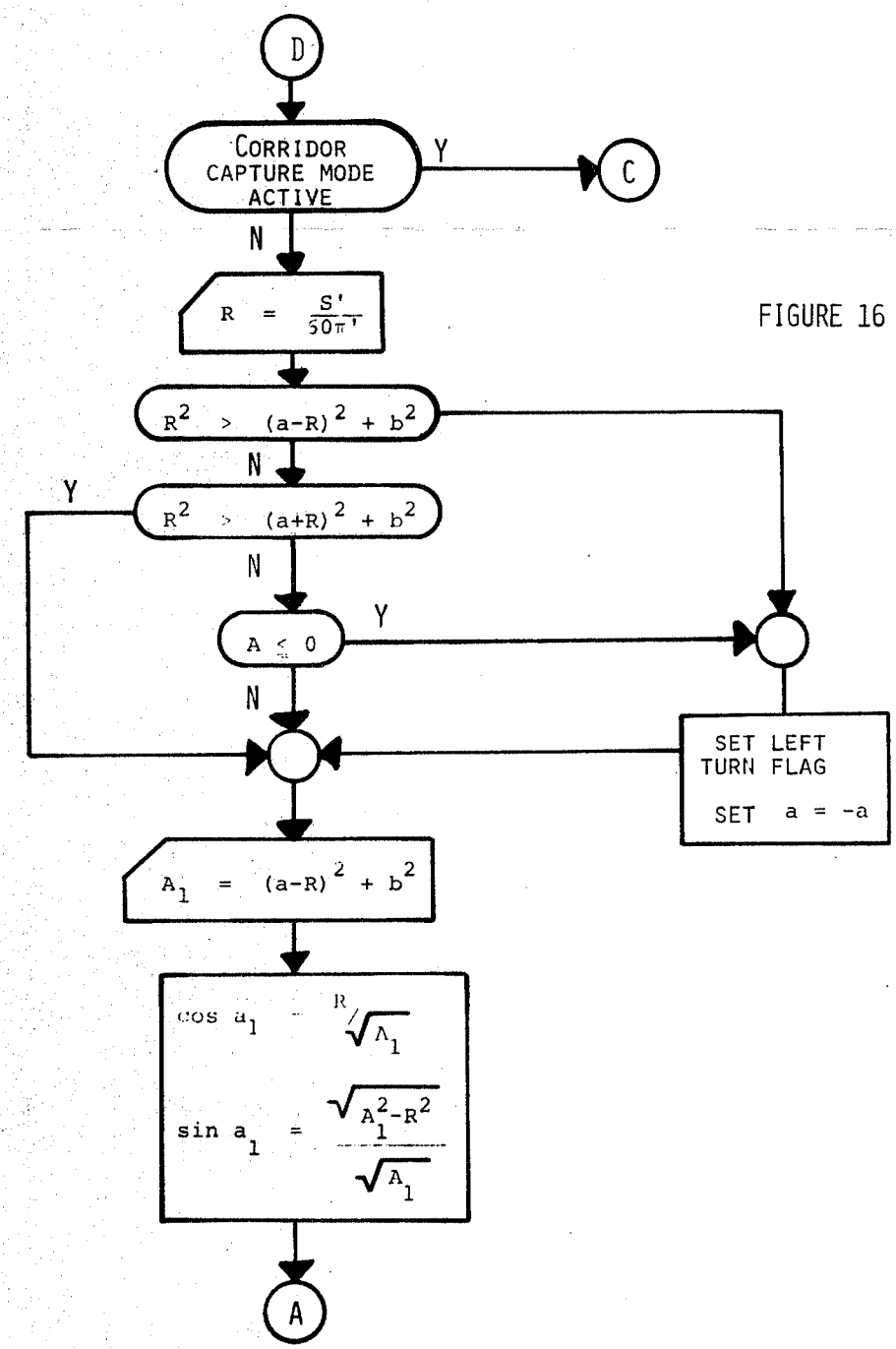
Figure 17:
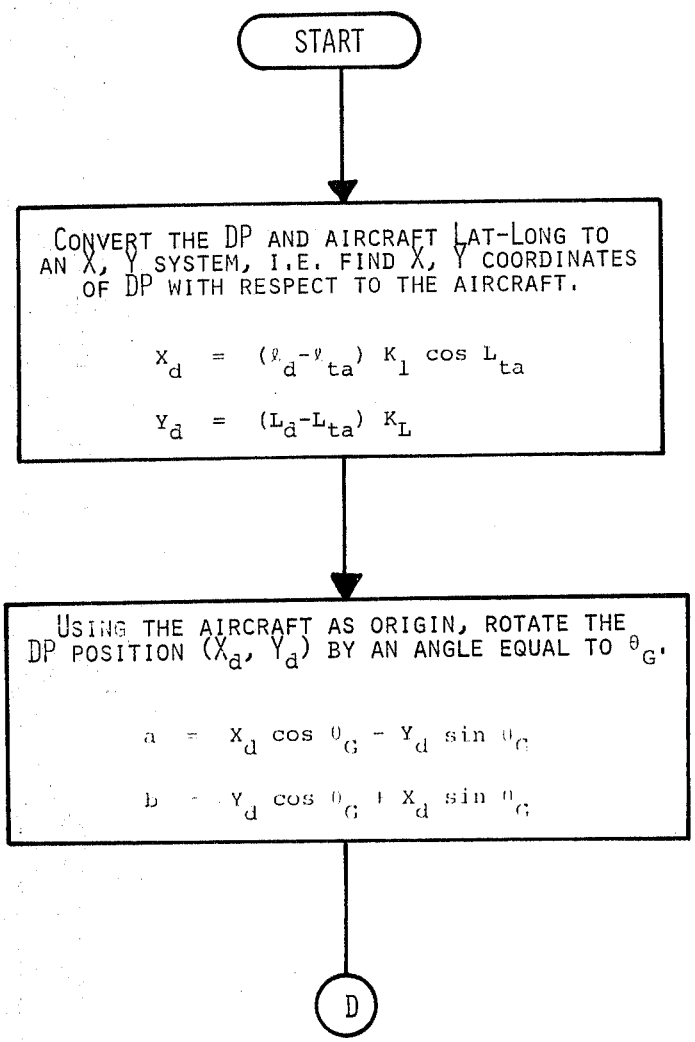
Figure 13:
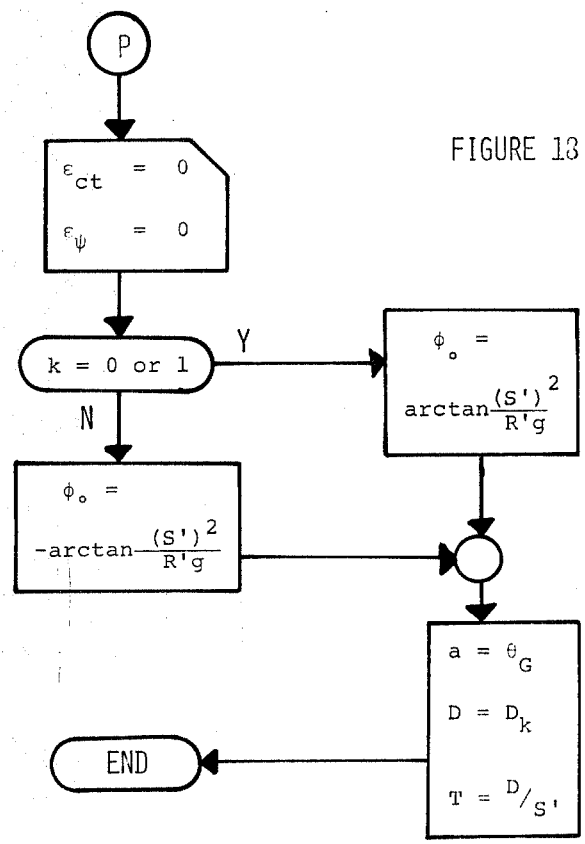
Figure 18A:
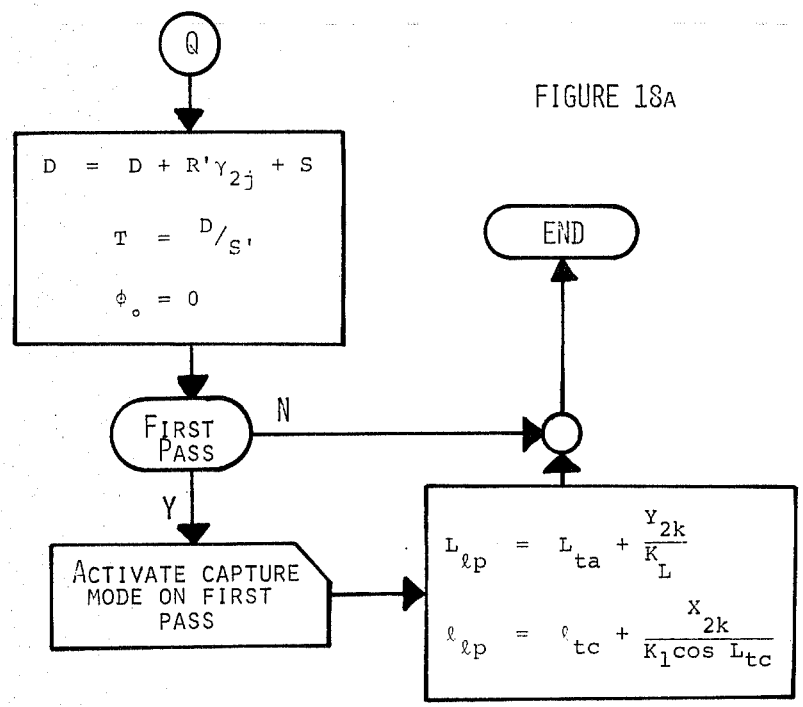
Figure 18B:
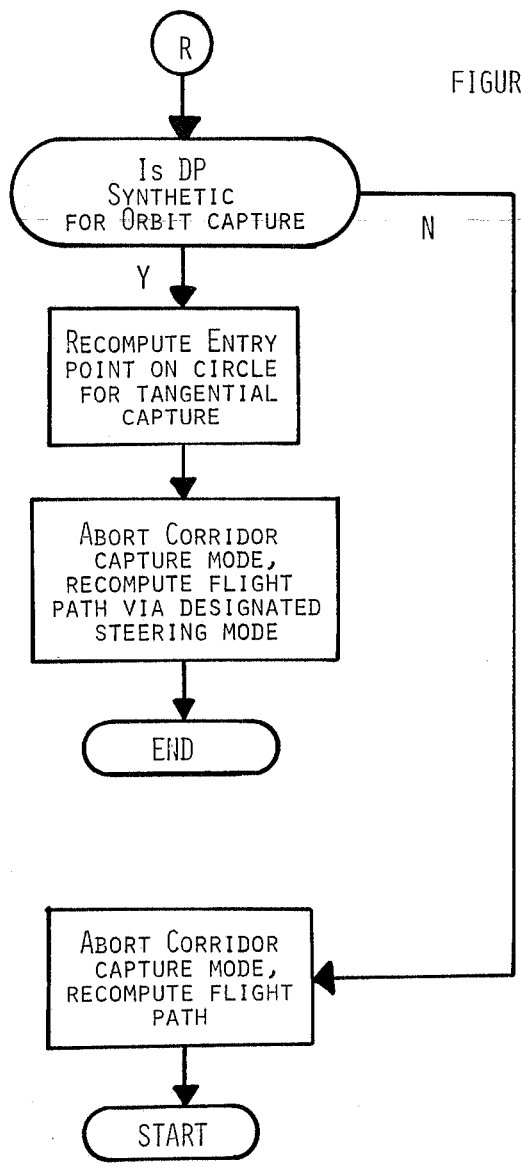
Figure 19:
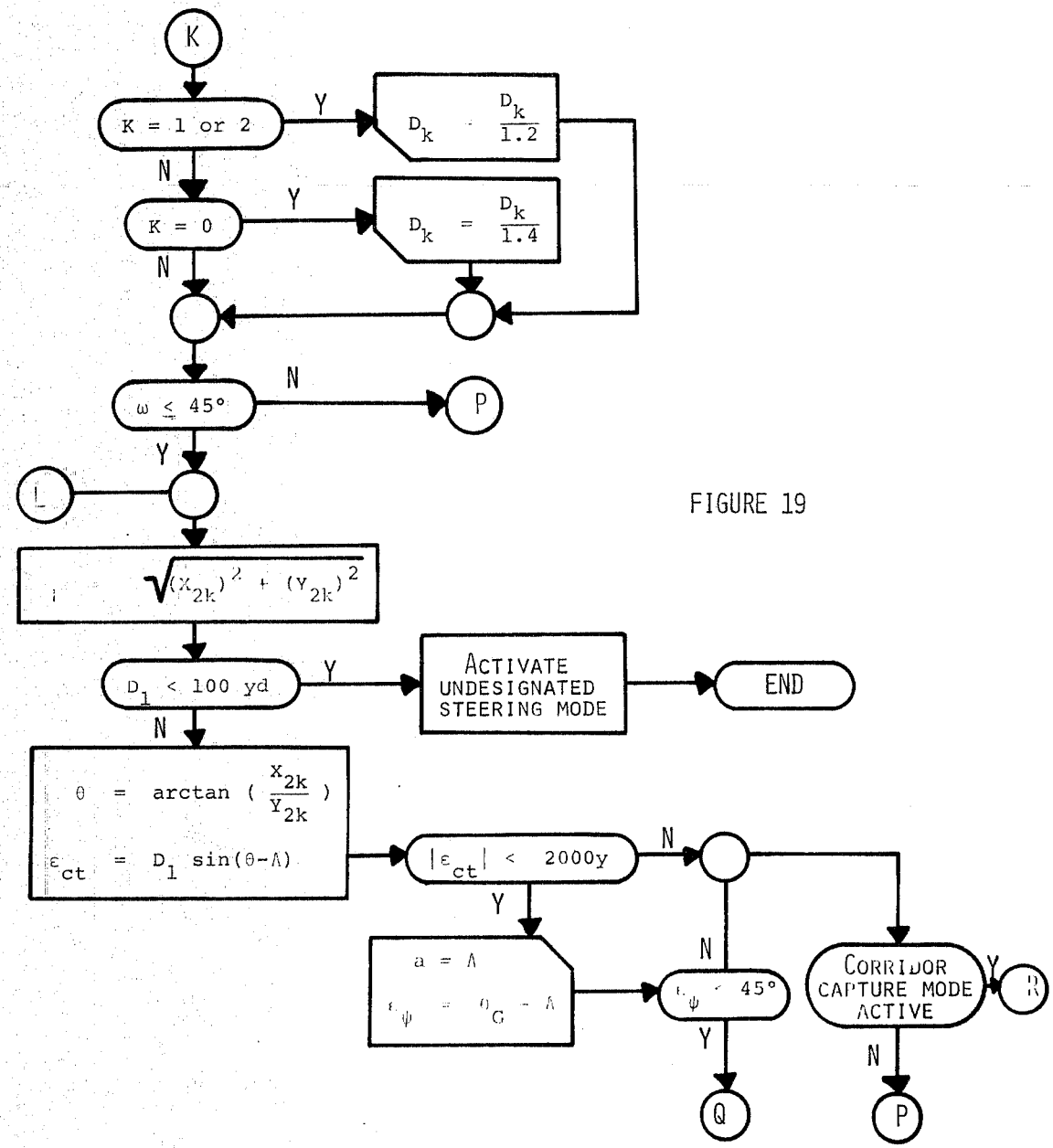
Figure 20:
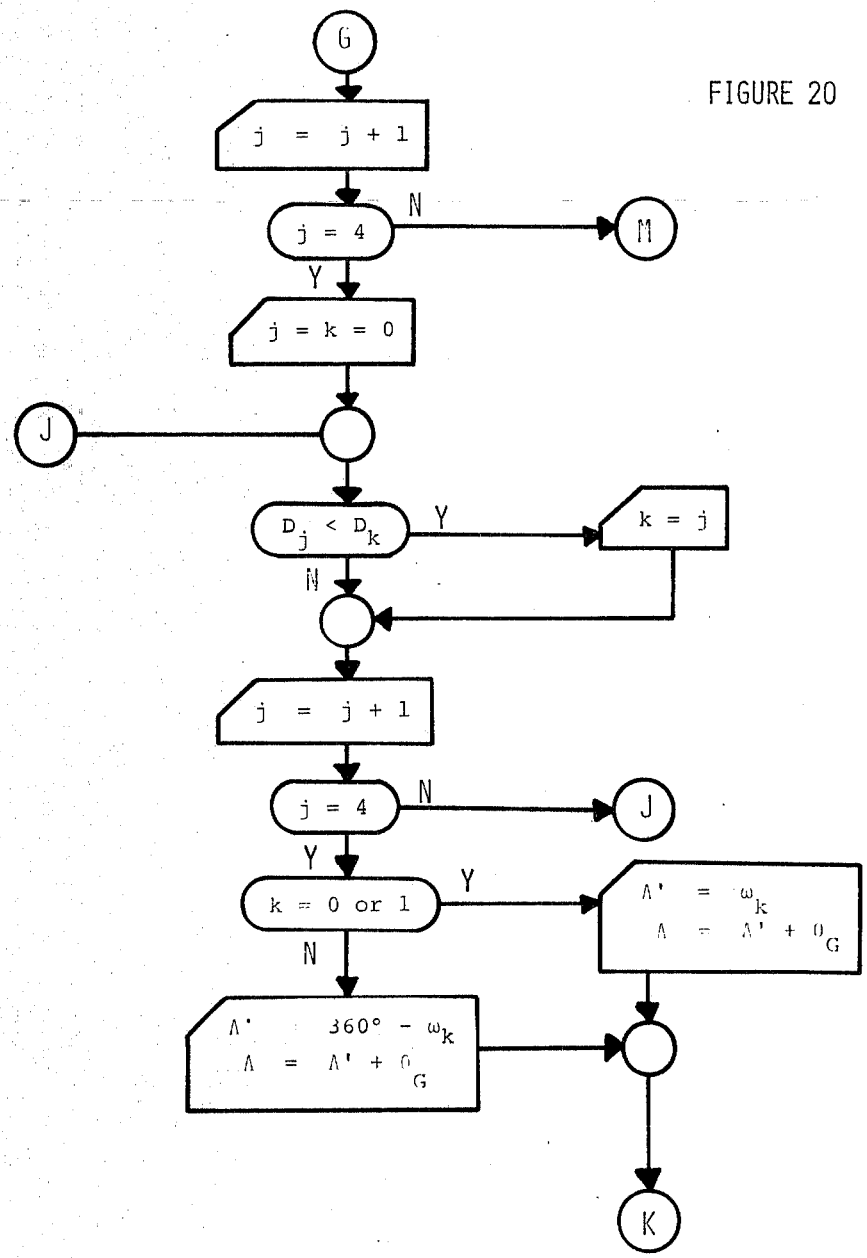
Figure 21:
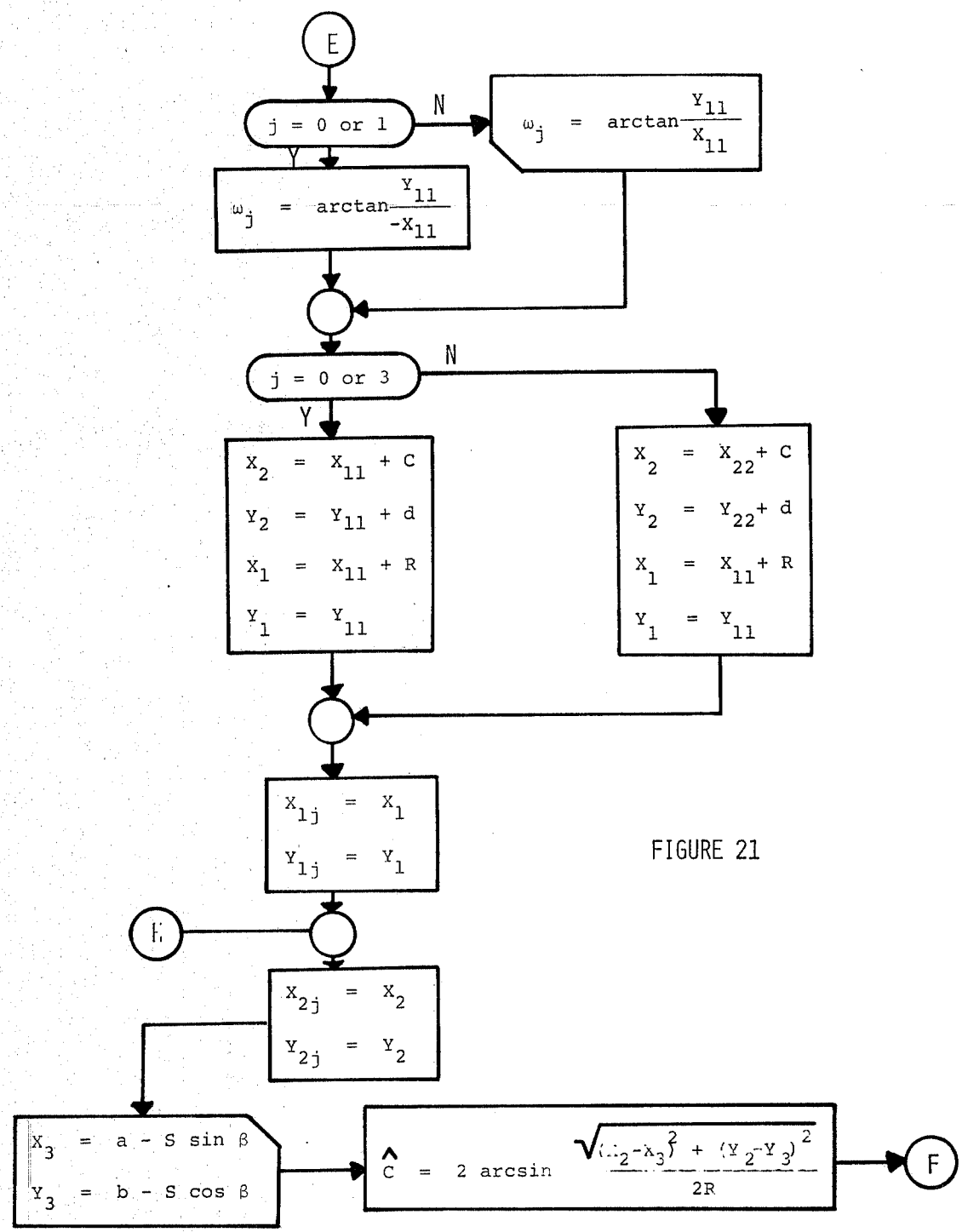
Figure 22:
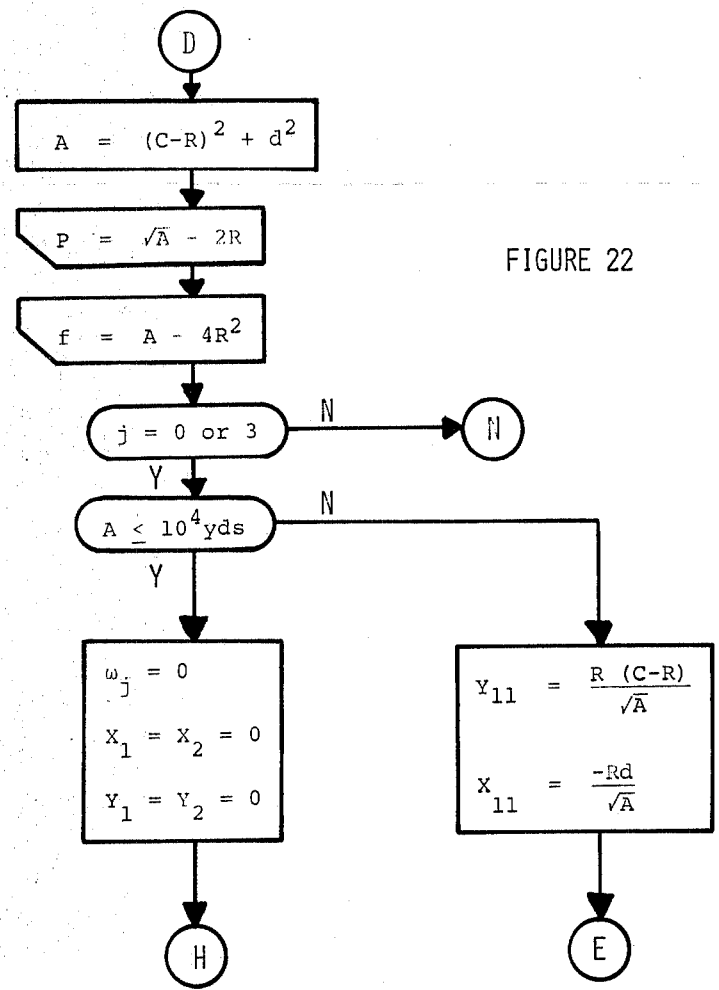
Figure 22A:
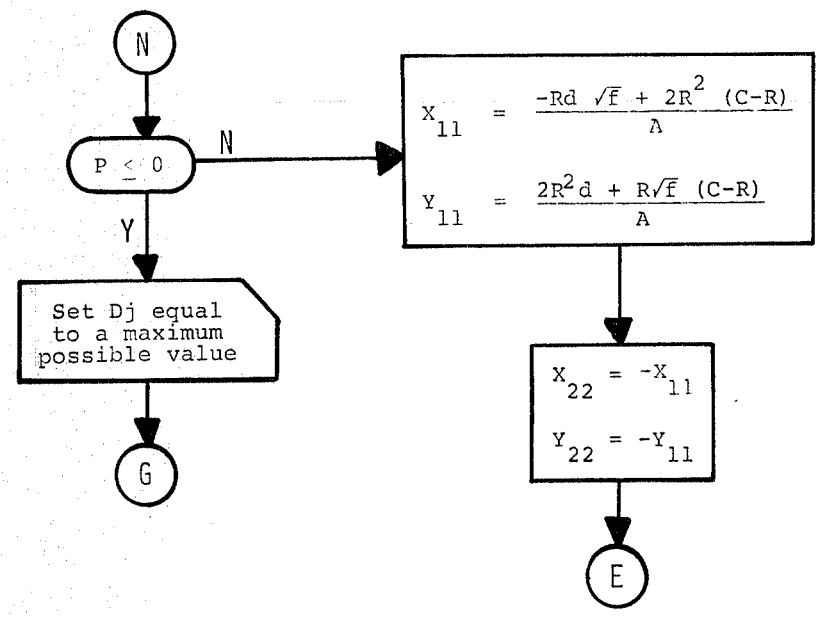
Figure 23:
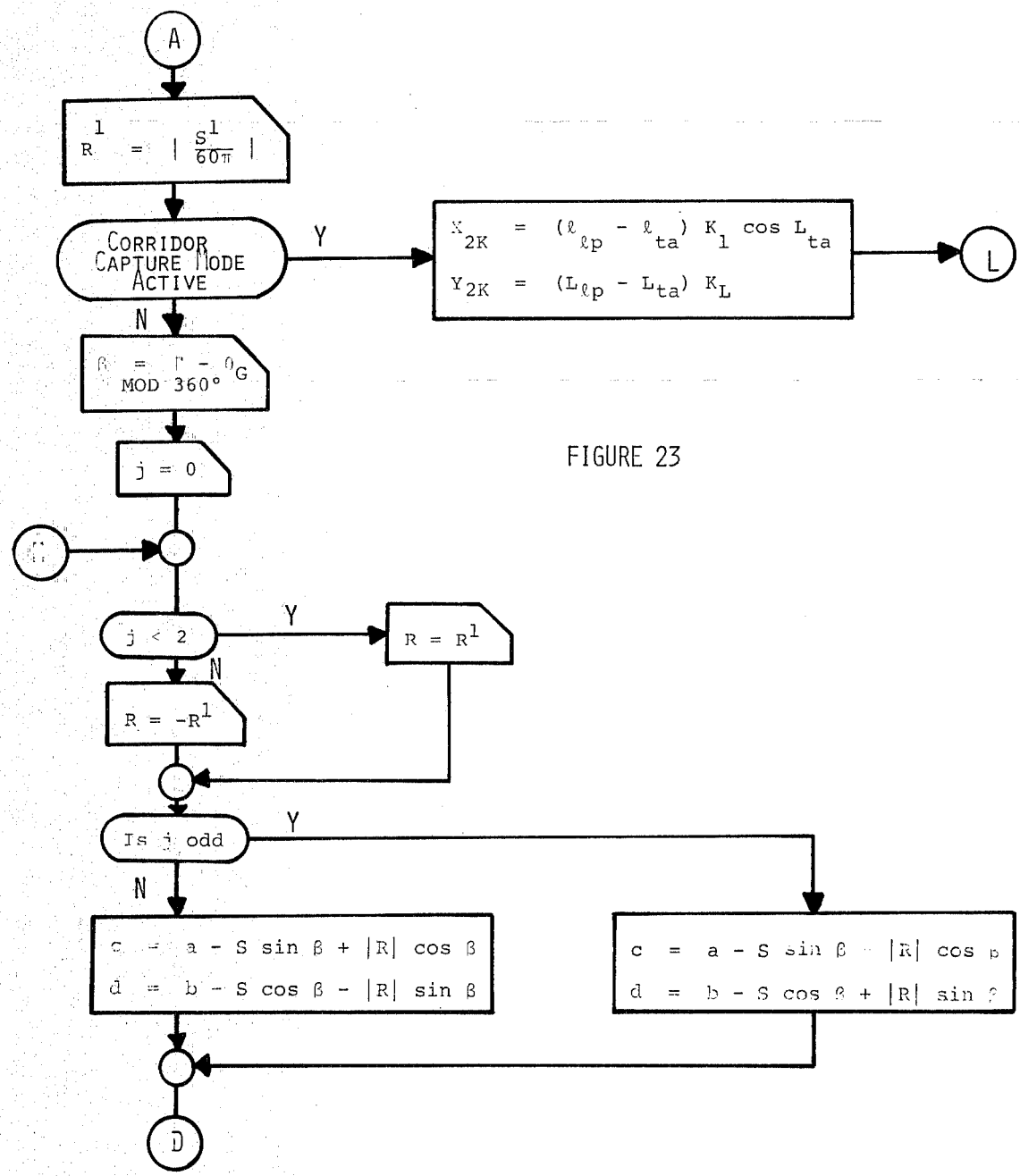
Figure 24:
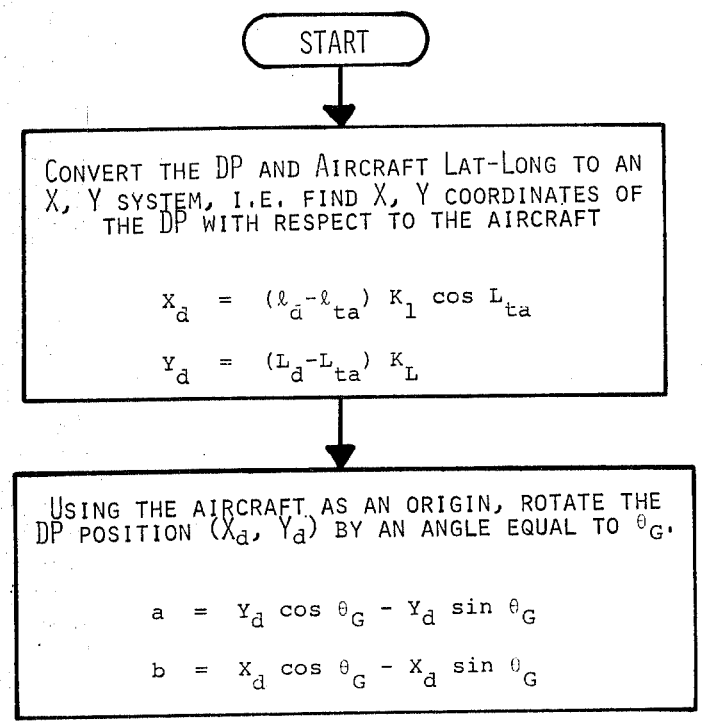

FIG. 8
DP destination point
NS1 navigation selector switch
PA NAV "programmed approach navigation" switch position
TRK CONT track control
FIG. 9
$\Delta h$ altitude difference
Di distance to entry point
Ti time to entry point
$h_c$ computed vertical velocity
$h_{max}$ maximum vertical velocity command
S' ground speed
FIG. 10
$\alpha$ prescribed glide slope angle
D distance to go
$x_{ad}$
$y_{ad}$ x and y components of distance to go
T time to go
$h_{min}$ minimum permissible altitude
FIG. 11
$\theta o$ command bank angle
R' radius half standard rate turn
g gravitational acceleration
FIG. 12
SCANAP self-contained approach navigation
TAS true air speed
FIG. 13
MS miliseconds
$H_T$ heading, true
$H_M$ heading, magnetic
MAG VAR magnetic variation
HDG heading
FIG. 14
$D_1$ distance to go to entry point
$x_d$, $y_d$ coordinates of D
$\Theta$ bearing to DP
$\epsilon_{c+}$ cross track error
$\alpha$ desired course
$\epsilon_\phi$ course error
$\theta_G$ aircraft track angle
FIG. 15
$X_n$, $Y_n$ distance to be flown in X and Y coordinates
FIG. 17
$x_d$, $Y_d$ x and y coordinates of destination point DP
$L_a$, $l_a$ latitude/longitude of the destination point DP
$L_{ta}$, $l_{ta}$ aircraft latitude and longitude
$K_1$ conversion constants
$L_{ta}$ aircraft latitude
$L_d$ latitude of destination point
$K_L$ conversion constants
FIG. 18
k arc traversed on final circle
$D_k$ total distance to go if pair K circles used
FIG. 18A
$\gamma 2j$ angle corresponding to arc traversed on final circle $Y_{2k}$ distance in Y coordinates from aircraft to entry point
$K_L$ conversion constants
$X_{2K}$ distance in X coordinates from aircraft to entry point
$K_l$ conversion constants
$L_{lp}$ $ll_p$ latitude/longitude of point of entry on final turn circle (entry point)
$L_{tc}$ $l_{tc}$ latitude/longitude of the aircraft
FIG. 19–21
$D_k$ distance from the aircraft to the entry point (final circle)
$D_l$ straight line distance from aircraft to entry point
$j$ type route between departure point and entry point on final circle (0, 1, 2, 3, 4)
$D_j$ total distance-to-go if pair j circles used
$\omega_k$ arc traversed on final circle
$\omega_j$ angle corresponding to arc traversed on initial circle
$**_2$ point where aircraft arrives at final circle
$Y_2$ point where aircraft arrives at final circle
$X_{22}$ )
$Y_{22}$ ) position $(X_2, Y_2)$ with respect to center of final circle
$c, d$ $x$ and $y$ coordinates of final circle
$X_{2j}$ ) point where aircraft arrives at final circle, if pair
$Y_{2j}$ ) of j circles used
$X_{2k}$ ) $x, y$ coordinates between aircraft and entry point $Y_{2k}$ )
S linear distance from final circle departure point
FIG. 22
A distance squared between initial and final turn circles
P distance between perimeters of those circles
$f$ working parameter
R radius of turn circle
FIG. 23
$\beta$ rotated aircraft angle at destination
$r$ destination designated track angle
$c, d$ $x$ and $y$ coordinates of final circle

1-1 DERIVATION OF CONVERSION CONSTANT "K"

The international nautical mile equals 6076.1033 feet. The geographic mile (i.e., 1 minute of arc length measured at the equator) equals 6087.08 feet. The longitude conversion constant, $K_l$, is used to relate nautical measurement to geographic measurement:

$$K_l = (\text{feet/degree/feet/nautical mile}) \quad (1)$$

substituting the above values yields
$K_l = [6087.08 \text{ feet per minute}) (60 \text{ minutes per degree})/6076.1033 \text{ feet/nautical mile}]$
$= 60.1084$ nautical miles/degree Also, the average length of a minute of arc length on a meridian is 6076.82 feet. To determine the latitude conversion constant, $K_L$, which is also used to relate nautical measurement to geographic measurement, the following equation is used:

$$K_L = (\text{feet/degree/feet/nautical mile}) \quad (2)$$

substituting the above values yields:
$K_L = [6076.82 \text{ feet/min}) (60 \text{ min/degree})/6076.1033 \text{ feet/nautical mile}]$
$= 60.0071$ nautical mile/degree $$K_{avg} = (K_l + K_L/2) \quad (3)$$

$= (60.1084 + 60.0071/2)$
$= 60.0578$ nautical miles/degree

1-2 SLANT RANGE AND BEARING TO LATITUDE/LONGITUDE

Given
$R_{Sl}$ = slant range
$h$ = aircraft altitude
$A$ = true bearing angle $0° \leq A \leq 360°$
$d$ = ground distance
$(x, y)$ = ground distance components
$(L_a, l_a)$ = aircraft Lat-Long
$(L_f, l_f)$ = Lat-Long of fixed position
and
$d = \sqrt{R_{Sl}^2 - h^2}$
$x = d \sin A$
$y = d \cos A$
and using Equations (1) and (2) for $K_l$ and $K_L$ then $$L_f = L_a + (y/K_L) \quad (4)$$

$$l_f = l_a + (x/K_l \cos L_a) \quad (5)$$

1-3 LAT-LONG CONVERSION TO X-Y

Given $(L_{rp}, l_{rp})$ = Lat-Long of reference pt.
$(X_{rp}, Y_{rp})$ = X-Y coordinates of reference pt.
and computing the synthetic reference Lat-Long $(L_R, l_R)$ by $$L_R = (L_{rp} + L_a/2) \quad (6)$$

$$l_R = (l_{rp} + l_a/2) \quad (7)$$

and using Equations (1) and (2) to derive $K_L$ and $K_l$,
then $X_{rp} = (l_{rp} - l_R) K_l \cos L_R$ (8)
$Y_{rp} = (L_{rp} - L_R) K_L$ (9)

1-4 X-Y CONVERSION TO LAT-LONG COORDINATES

Given $(L_{rp}, l_{rp})$ = Lat-Long of reference pt.
$(L_R, l_R)$ = Lat-Long of synthetic ref.
$(X_{rp}, Y_{rp})$ = X-Y coordinates of reference pt.
and using Equations (1), (2), (6) and (7) for $K_L$, $K_l$, $L_R, l_R$
then $L_{rp} = L_R + (Y_{rp}/K_L)$ (10)
$l_{rp} = l_R + (X_{rp}/K_l \cos L_R)$ (11)

1-5 CONVERT VELOCITY TO SPEED AND DIRECTION

Given $(V_x, V_y)$ = X-Y velocity components
$S$ = Speed
$\theta$ = true north direction
then
$S = \sqrt{V_x^2 + V_y^2}$ (12)
$\theta = \arctan (V_x/V_y)$ (13)

1-6 CONVERT SPEED AND DIRECTION TO VELOCITY

Given $(V_x, V_y)$ = X-Y components of velocity
$S$ = Speed
$\theta$ = true north direction
then
$V_x = S \sin \theta$ (14)
$V_y = S \cos \theta$ (15)

1-7 COMPUTE DISTANCE INCREMENTS DUE TO SYSTEM DRIFT

Given $(V_{sx}, V_{sy})$ = System drift velocity
$(\Delta X_{sd}, \Delta Y_{sd})$ = System drift increments
$\Delta t$ = Navigational cycle ($\approx$200 ms)

then $\Delta X_{sd} = \Delta t\, V_{sx}$ (16)

$\Delta Y_{sd} = \Delta t\, V_{sy}$ (17)

1-8 UPDATE AIRCRAFT GEOGRAPHIC POSITION

Given $(Lg_i, lg_i)$ = aircraft geographic position
$(Lg_{i-1}, lg_{i-1})$ = previous aircraft geographic position
$(\Delta X_{sd}, \Delta Y_{sd})$ = system drift increments
$(DS_{EW_i}, DS_{NS_i})$ = dead reckoning increments
and using Equations (1) and (2) to derive $K_L$ and $K_l$,
then $Lg_i = Lg_{i-1} + (DS_{NS_i} + \Delta Y_{sd}/K_L)$ (18)

$lg_i = lg_{i-1} + (DS_{EW_i} + \Delta X_{sd}/K_l \cos -Lg_{i-1})$ (19)

1-9 UPDATE AIRCRAFT DOPPLER POSITION

Given $(LD_i, lD_i)$ = aircraft doppler position
$(LD_{i-1}, lD_{i-1})$ = previous aircraft doppler position
$(DS_{EWD_i}, DS_{NSD_i})$ = doppler dead reckoning increments
$(\Delta X_{sd}, \Delta Y_{sd})$ = system drift increments
and using Equations (1) and (2) to derive $K_L$ and $K_l$,
then $LD_i = LD_{i-1} + (DS_{NSD_i} + \Delta Y_{sd}/K_L)$ $lD_i = lD_{i-1} + (DS_{EWD_i} + \Delta X_{sd}/K_l \cos LD_{i-1})$ (20)

$\theta_0, \theta_1, \theta_2, \theta_3, \theta_4$ = 5 samples of true heading
$\Delta\theta_j$ = heading change between the jth heading sample and the previous sample.
$\theta_{H_j}$ = weghted average of true heading
then $\Delta\theta_j = \theta_j - \theta_{j-1}$ (21)

$$K_j = \frac{\Delta\theta_j}{\sum_{K=1}^{K=4} \theta_K}$$ (22)

$$\theta_{H_j} = \sum_{j=1}^{j=4} K_j \theta_j$$ (23)

2-1 Heading (4) A heading flow chart is shown in FIG. 13

2-2 SMOOTH TRUE AIR SPEED

Given $S_{as_i}$ = smoothed air speed
$S_{as_{i-1}}$ = previous smoothed air speed
$S_{a_R}$ = raw air speed
$\alpha$ = air speed smoothing factor*

$$S_{as_i} = \alpha S_{as_{i-1}} + (1-\alpha) S_{a_1}$$ (24)

* NOTE: This factor must be determined via flight tests, since it will change from aircraft to aircraft. Initially, 0.5 should be used.

2-3 TEST TRUE HEADING

Given $S_{as_i}$ = smoothed true air speed
$\theta_{H_i}$ = weighted average true heading
$\theta_{H_{i-1}}$ = previous weighted average true heading
$\Delta\theta_{H_i}$ = difference between two successive weighted average headings
$\Delta H$ = rate of heading change
$\Delta t$ = navigation cycle ($\approx 200$ ms)
$C = 2998.6$ (constant based on max. bank angle of 70°)

$\Delta H = (C/S_{as_i})$ (25)

$\Delta\theta_{H_i} = \theta_{H_i} - \theta_{H_{i-1}}$ (26)

if $\Delta\theta_{H_i} \geq \Delta H\, \Delta t$ (in seconds), switch to alternate heading source and set warning flag (light) in cockpit.

2-4 COMPUTE COMPONENTS OF GROUND DELTA DISTANCES (DR) POSITION INCREMENTS

Given $\theta_{H_i}$ = weighted average true heading
$DS_{D_i}$ = raw delta distance across heading
$DS_{H_i}$ = raw delta distance along heading
$DS_{EW_i}$ = delta distance east-west DR INCREMENTS
$DS_{NS_i}$ = delta distance north-south DR INCREMENTS
then $DS_{EW_i} = DS_{D_i} \cos\theta_{H_i} + DS_{H_i} \sin\theta_{H_i}$ (27)

$DS_{NS_i} = DS_{H_i} \cos\theta_{H_i} - DS_{D_i} \sin\theta_{H_i}$ (28)

2-5 COMPUTE COMPONENTS OF GROUND VELOCITY

Given $(DS_{EW_i}, DS_{NS_i})$ = dead reckoning increments
$(V_{grx_i}, V_{gru_i})$ = ground velocity components
$\Delta t$ = navigation cycle ($\approx 200$ ms)
then
$V_{grx_i} = (DS_{EW_i}/\Delta t)$ (29)

$V_{gru_i} = (DS_{NS_i}/\Delta t)$ (30)

2-6 COMPUTE GROUND SPEED

Given $(V_{grx_i}, V_{gru_i})$ = ground velocity components
$S_{gr_i}$ = ground speed
then $S_{gr_i} = \sqrt{V_{grx_i}^2 + V_{gru_i}^2}$ (31)

2-7 TEST FOR REASONABLENESS OF GROUND SPEED

Given $S_{gr_i}$ = ground speed (new)
$S_{gr_{i-1}}$ = previous ground speed (presently in use)
$\Delta S_{gr_i}$ = difference between $S_{gr_i}$ and $S_{gr_{i-1}}$
then $$\Delta S_{gr_i} = S_{gr_i} - S_{gr_{i-1}}$$ (32)

If $\Delta S_{gr_i} > 0.20\, S_{gr_{i-1}}$ use the air data mode to determine ground speed.

2-8 COMPUTE COMPONENTS OF AIR SPEED

Given $S_{as_i}$ = smoothed air speed
$\theta_{H_i}$ = weighted average true heading
$(V_{ax_i}, V_{au_i})$ = air velocity components
then $V_{ax_i} = S_{as_i} \sin\theta_{H_i}$ (33)

$V_{au_i} = S_{as_i} \cos\theta_{H_i}$ (34)

2-9 COMPUTE WIND VELOCITY

Given $(V_{ax_i}, V_{au_i})$ = air velocity components
$(V_{grx_i}, V_{gru_i})$ = ground velocity components
$(V_{wx_i}, V_{wu_i})$ = wind velocity components
then $V_{wx_i} = V_{grx_i} - V_{ax_i}$ (35)

$V_{wu_i} = V_{gru_i} - V_{au_i}$ (36)

2-10 SMOOTH WIND VELOCITY

Given $(V_{wx_i}, V_{wu_i})$ = wind velocity
$(V_{S_{wx_i}}, V_{S_{wy_i}})$ = smoothed wind velocity components
$(V_{S_{wx_{i-1}}}, V_{S_{wy_{i-1}}})$ = previous smoothed wind velocity components
$\gamma$ = wind velocity smoothing factor*
then $V_{S_{wx_i}} = \gamma V_{S_{wx_{i-1}}} + (1-\gamma) V_{wx_i}$ (37)

$V_{S_{wy_i}} = \gamma V_{S_{wy_{i-1}}} + (1-\gamma) V_{wu_i}$ (38)

*NOTE: This factor ($\gamma$) must be determined by flight test. Use 0.9 initially.

2-11 COMPUTE DRIFT ANGLE

Given: $DS_{D_i}$ = raw delta distance across heading
$DS_{H_i}$ = raw delta distance along heading
$\omega$ = drift angle
then $\omega = \text{Arctan}\,(DS_{D_i}/DS_{H_i})$ (39)

2-12 COMPUTE TRACK ANGLE

Given $\theta_H$ = last sample of $H_T$ $\omega$ = drift angle
$\theta_T$ = track angle
then $\theta_T = \omega + \theta_H$ (40)

AIR DATA MODE

2-13 SMOOTH AIR SPEED
Use Equation (24)

2-14 TEST TRUE HEADING
Use Equations (25) and (26)

2-15 COMPUTE COMPONENTS OF AIR SPEED
Use Equatios (33) and (34)

2-16 COMPUTE GROUND VELOCITY USING WIND
Given $(V_{grx_i}, V_{gru_i})$ = ground velocity components
$(V_{ax_i}, V_{au_i})$ = air velocity components
$(V_{s_{wx_i}}, V_{s_{wy_i}})$ = smoothed wind velocity components (stored)
then
$V_{grx_i} = V_{ax_i} + V_{s_{wx_i}}$ (41)
$V_{gru_i} = V_{au_i} + V_{s_{wy_i}}$ (42)

2-17 COMPUTE TRACK ANGLE
Use ground velocity components derived in Equations (41) and (42)
Given $(V_{grx_i}, V_{gru_i})$ = Ground velocity components
$\theta_T$ = track angle
then
$\theta_T = \arctan(V_{grx_i}/V_{gru_i})$ (43)

2-18 Compute Drift Angle
Given $\theta_H$ = latest sampling of true heading
$\theta_T$ = track angle
then $\omega$ = drift angle
$\omega = \theta_T - \theta_H$ (44)

2-19 COMPUTE POSITION INCREMENTS
Given $(DS_{EW_i}, DS_{NS_i})$ = dead reckoning increments
$(V_{grx_i}, V_{gru_i})$ = ground velocity components
$\Delta t$ = navigation cycle ($\approx$200 ms)
then $DS_{EW_i} = V_{grx_i} \Delta t$ (45)
$DS_{NS_i} = V_{gru_i} \Delta t$ (46)

2-20 COMPUTE THE 50 MS X-Y POSITION INCREMENTS
Given $(V_{grx_i}, V_{gru_i})$ = ground velocity components
$(V_{sd_x}, V_{sd_y})$ = system drift velocity components
$(\delta_x, \delta_y)$ = extrapolated position increments
$\Delta t$ = navigation cycle (50 ms)
then $$\delta_x = (V_{grx_i} + V_{sd_x}) \Delta t$$
(47)

$$\delta y = (V_{gru_i} + V_{sd_y}) \Delta t$$
(48)

2-21 COMPUTE EQUIVALENT LAT-LONG INCREMENTS
Given $(\delta_x, \delta_y)$ = extrapolated position increments
$(\delta_L, \delta_l)$ = extrapolated position increments
$(Lg_i, lg_i)$ = aircraft Lat-Long Position
$(Lg_{i-1}, lg_{i-1})$ = previous aircraft Lat-Long position
and using Equations (1) and (2) to derive $K_L$ AND $K_l$, then $$\delta_L = (\delta y/K_L)$$
(49)

$$\delta_l = (\delta x/K_l \cos Lg_{i-1})$$
(50)

Given $(L_{rp_{st}}, l_{rp_{st}})$ = stored position of reference point $(L_{g_{OTB}}, l_{g_{OTB}})$ = aircraft system-held position at ON-TOP TIME
$(\Delta X_{sd_c}, \Delta Y_{sd_c})$ = correction coordinates to system drift
and using Equations (1) and (2) to derive $K_L$ and $K_l$, then $$\Delta X_{sd_c} = (lrp_{st} - l_{g_{OTB}}) K_l \cos La_{OTB}$$
(51)

$$\Delta Y_{sd_c} = (Lrp_{st} - Lg_{OTB}) K_L$$
(52)

and using Equations (1) and (2) to derive $K_L$ and $K_l$,
then $\Delta Xg_c = (Lrp_{st} - Lg_{OTB}) K_L$ (55)
$\Delta Yg_c = (lrp_{st} - lg_{OTB}) K_l \cos Lg_{OTB}$ (56)
and $$Lg_i = Lg_{i-1} + (\Delta Xg_c/K_L)$$
(57)

$$lg_i = lg_{i-1} + (\Delta Yg_c/K_l \cos Lg_{i-1})$$
(58)

Given $(\Delta X_{sd_c}, \Delta Y_{sd_c})$ = correction coordinates to system drift
$(V_{sx_i}, V_{sy_i})$ = system drift velocity (new or corrected)
$(V_{sx_{i-1}}, V_{sy_{i-1}})$ = previous system drift velocity
$\Delta t$ = time elapsed since last accepted system drift (or time of initialization ON TOP input)
Then
$V_{sx_i} = V_{sx_{i-1}} + (\Delta X_{sd_c}/\Delta t)$ (53)
$V_{sy_i} = V_{sy_{i-1}} + (\Delta Y_{sd_c}/\Delta t)$ (54)
If the system drift is accepted by the Pilot or Copilot, the following is processed:
Given $(Lg_i, lg_i)$ = aircraft geographic position
$(Lg_{i-1}, lg_{i-1})$ = previous aircraft geographic position
$(Lg_{OTB}, lg_{OTB})$ = aircraft geographic position at time of ON TOP
$(Lrp_{st}, lrp_{st})$ = stored position of reference point
$(\Delta Xg_c, \Delta Yg_c)$ = correction coordinates to aircraft geographic position While the invention has been described with reference to specific embodiments, it will be obvious to those skilled in the art that the invention may be practiced with other embodiments without departing from the scope of the invention. The scope of the invention is defined only in the following claims.

That which is claimed is:

1. Self-contained on-board navigation apparatus for navigating a craft between distant points of known latitude and longitude comprising a craft, input means mounted on the craft for inputting latitudes and longitudes of the points, a computing means connected to the input means for computing a path between the points, a heading reference mounted on the craft and connected to the computing means for supplying craft heading signals to the computing means, a speed sensor mounted on the craft and connected to the computing means for supplying speed signals to the computing means, start means mounted on the craft and connected to the computing means for supplying a start signal to the computing means when the craft is adjacent an initial point, whereby applying of heading and speed signals against latitude and longitude for creating incremental latitude and longitude changes is begun by the computing means upon receiving the start signal, and output means connected to the computing means for indicating positional characteristics of the craft.

2. The navigation apparatus of claim 1 wherein the computing means comprises a digital computer and wherein the data processing means further comprises converter means for converting incoming speed and heading analog signals to digital signals and for converting outgoing digital command signals to analog command signals.

3. The navigation apparatus of claim 1 wherein the command means comprises visual display means for visually displaying turning commands for returning the vehicle to the path.

4. The self-contained navigation apparatus of claim 1 wherein the craft is an aircraft and wherein the known points comprise an initial point and a destination point further comprising an altitude sensor for producing altitude signals, and wherein the correction means receives the altitude signals and produces altitude correction signals and wherein the command means comprises a flight director indicator for indicating bank and pitch signals for returning the aircraft to a path according to command signals and a horizontal situation indicator for indicating a horizontal track of the path, a horizontal track of the aircraft and a relationship therebetween.

5. The navigation apparatus of claim 1 for navigating an aircraft from an initial known point to a destination point, wherein the heading reference comprises an inertial-quality heading reference, wherein the speed sensor comprises a Doppler radar mounted beneath the aircraft, and further comprising a barometric altimeter mounted on the aircraft for producing altitude signals, a key set mounted on the aircraft for inserting latitude and longitude designations of the initial and destination points and approach direction for the destination point, and wherein the correction means comprises means for storing latitude and longitude and approach heading data, a converter for converting signals to digital data, and means for producing dead reckoning incremental position changes of the aircraft and for comparing aircraft position with a computed path having curved portions and straight line portions between the initial point and destination point, and wherein the command means comprises a flight director indicator having bank and pitch displays for displaying proper maneuvers for guiding the aircraft along the path.

6. The navigation apparatus of claim 1 for navigating an aircraft between a first known geographic initial point and a second known geographical destination point on a predetermined approach heading with respect to the destination point wherein the heading reference comprises an inertial-quality heading reference and a magnetic compass for producing first and second heading signals, wherein the speed sensor comprises a Doppler radar mounted beneath the aircraft and a true air speed sensor and smoothing apparatus mounted on the aircraft for producing first and second speed signals and further comprising an altimeter mounted on the aircraft for producing altitude signals and a key set mounted on the aircraft for inserting latitude and longitude data of the initial and destination points and the desired predetermined approach heading for the destination point and wherein the correction means comprises means for storing the computing data and computing means for selecting the first or second heading signal and the first or second speed signal, for computing a path between the initial point and the destination point, and for dead reckoning the aircraft from the incoming signals and for comparing the dead reckoned aircraft position with the path and for producing correction signals therefrom and wherein the command means comprises visual display means for displaying the bank and pitch commands for returning an aircraft to the path.

7. The method of precisely navigating a craft with self-contained on-board equipment between points of known latitude and longitude independently of continuous external inputs comprising inputting to an on-board computer latitudes and longitudes of distant initial and destination points and a heading on which an approach to the destination point is to be made, computing a path between the points with final heading in a desired direction, sensing speed and heading of the craft, comparing sensed speed and heading with the path, incrementally calculating changing position of the craft with respect to the path, and displaying positional characteristics of the craft.

8. The method of claim 7 further comprising further inputting to the on-board computer altitude of the destination point, desired glide slope to the destination point and pattern altitude of a final approach portion of the path, wherein the computing step further comprises computing a path having a first straight line portion and a first slope to desired pattern altitude and having a turn at pattern altitude to a final approach and further comprising a directing step which comprises directing the turning of the vehicle to a first straight line portion of the path and correcting the vehicle altitude to the desired pattern altitude before directing a second turning of the vehicle to a final approach portion of the path at the pattern altitude.

9. The method of claim 7 further comprising comparing vehicular position increments with computed path increments and wherein the displaying step comprises displaying craft positional characteristics in comparison to desired characteristics.

10. The method of claim 9 further comprising computing a new path to the destination point when a craft exceeds an imaginary corridor about the original path, and producing correction signals for returning the vehicle to the new path.

11. The method of claim 7 further comprising continuously measuring height above ground and inputting height measurement to the computer, comparing height measurement with predetermined desired height at vehicular position and displaying attitude and speed correction commands for regaining a predetermined desired altitude path.

12. Self-contained on-board navigation apparatus for navigating a craft from a point of known latitude and longitude comprising a craft, input means mounted on the craft for inputting latitude and longitude of the point , a computing means connected to the input means for computing latitude and longitude of the craft, a heading reference mounted on the craft and connected to the computing means for supplying craft heading signals to the computing means, a speed sensor mounted on the craft and connected to the computing means for supplying speed signals to the computing means, start means mounted on the craft and connected to the computing means for supplying a start signal to the computing means when the craft is adjacent an initial point, whereby applying of heading and speed signals against latitude and longitude for creating incremental latitude and longitude changes is begun by the computing means upon receiving the start signal, and output means connected to the computing means for indicating positional characteristics of the craft.

* * * * *